US011249692B2

United States Patent
Martin

(10) Patent No.: US 11,249,692 B2
(45) Date of Patent: Feb. 15, 2022

(54) DATA PLACEMENT FOR RAID GROUPS OF HETEROGENEOUS STORAGE DEVICE CAPACITIES

(71) Applicant: EMC IP Holding Company LLC, Hopkinton, MA (US)

(72) Inventor: Owen Martin, Hopedale, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/877,739

(22) Filed: May 19, 2020

(65) Prior Publication Data
US 2021/0365216 A1    Nov. 25, 2021

(51) Int. Cl.
*G06F 3/06* (2006.01)

(52) U.S. Cl.
CPC ........... *G06F 3/0689* (2013.01); *G06F 3/061* (2013.01); *G06F 3/0614* (2013.01); *G06F 3/0631* (2013.01); *G06F 3/0653* (2013.01); *G06F 3/0659* (2013.01)

(58) Field of Classification Search
CPC .... G06F 3/0689; G06F 3/0653; G06F 3/0614; G06F 3/0631; G06F 3/061; G06F 3/0659
See application file for complete search history.

(56) References Cited

U.S. PATENT DOCUMENTS

| 7,949,637 | B1 | 5/2011 | Burke | |
| 9,152,349 | B2 | 10/2015 | Yochai | |
| 9,513,814 | B1* | 12/2016 | Can | G06F 3/0649 |
| 2017/0262223 | A1* | 9/2017 | Dalmatov | G06F 3/0659 |

* cited by examiner

*Primary Examiner* — Kalpit Parikh
(74) *Attorney, Agent, or Firm* — Muirhead and Saturnelli, LLC

(57) ABSTRACT

Techniques for performing data movements may include configuring RAID groups included in a same storage tier, wherein a first of the RAID groups includes a first plurality of physical storage devices each having a first storage capacity, and wherein a second of the RAID groups includes a second plurality of physical storage devices each having a second storage capacity, wherein the first storage capacity is different than the second storage capacity; selecting, in accordance with criteria, a first data portion from the first RAID group for data movement to the second RAID group, wherein the criteria includes a read workload criterion that specifies a same target read I/O workload for each of the plurality of RAID groups; and responsive to said selecting the first data portion for data movement, performing the data movement of the first data portion from the first RAID group to the second RAID group.

20 Claims, 13 Drawing Sheets

DATA PLACEMENT FOR RAID GROUPS OF HETEROGENEOUS STORAGE DEVICE CAPACITIES

BACKGROUND

Technical Field

This application generally relates to data storage.

Description of Related Art

Data storage systems may include resources used by one or more host systems. The data storage systems and the host systems may be interconnected by one or more communication connections such as in a network. These resources may include, for example, data storage devices such as those included in the data storage systems. These data storage systems may be coupled to the one or more host systems where the data storage systems provide storage services to each host system. Multiple data storage systems from one or more different vendors may be connected and may provide data storage services for the one or more host systems.

A host may perform a variety of data processing tasks and operations. For example, an application may executed on the host and the application may issue I/O (input/output) operations, such as data read and write operations, sent to the data storage system.

The host systems may store data to and/or retrieve data from a storage device included in a data storage system containing a plurality of host interface units, physical storage devices or drives, and physical storage interface units. The storage device may be a logical storage device. The host systems access the storage device through a plurality of channels provided therewith. The host systems may perform read and write operations through the channels to the data storage system and the data storage system provides the data to the host systems also through the channels. The host systems do not address the physical storage devices or drives of the data storage system directly, but rather, access what appears to the host systems as a plurality of logical storage devices or units (which may or may not correspond to the actual physical storage devices or drives). Allowing multiple host systems to access a single storage device allows the host systems to share data of the storage device. In order to facilitate sharing of the data on the storage device, additional software on the data storage systems may also be used.

SUMMARY OF THE INVENTION

Embodiments of the techniques herein include a method, computer readable medium and system for performing data movements comprising: configuring a plurality of RAID groups included in a same storage tier, wherein a first of the plurality of RAID groups includes a first plurality of physical storage devices each having a first storage capacity, and wherein a second of the plurality of RAID groups includes a second plurality of physical storage devices each having a second storage capacity, wherein the first storage capacity is different than the second storage capacity; selecting, in accordance with criteria, a first data portion from the first RAID group for data movement to the second RAID group, wherein the criteria includes a read workload criterion that specifies a same target read I/O workload for each of the plurality of RAID groups; and responsive to said selecting the first data portion for data movement, performing the data movement of the first data portion from the first RAID group to the second RAID group. The same target read I/O workload may be a same target read I/O workload range.

In at least one embodiment, the criteria may include a write workload criterion specifying one of a plurality of target write I/O workloads for each of the plurality of RAID groups, and wherein said plurality of target write I/O workloads for the plurality of RAID groups may vary in accordance with storage capacities of physical storage devices of the plurality of RAID groups. The plurality of target write I/O workloads may be a plurality of target write I/O workload ranges. Processing may include predicting a plurality of write scores for the plurality of RAID groups, wherein each of the plurality of write scores denotes a write score for a different one of the plurality of RAID groups; and classifying each of the plurality of write scores corresponding to one of the plurality of RAID groups as balanced or unbalanced, wherein said each write score is balanced if said each write score is within a particular one of the plurality of target write I/O workload ranges associated with said one RAID group, and wherein said each write score is otherwise unbalanced. Processing may include determining, in accordance with said classifying, that one of the first RAID group and the second RAID group has an unbalanced write score; and responsive to determining that one of the first RAID group and the second RAID group has an unbalanced write score, performing first processing to alleviate or correct the unbalanced write score. The first processing may include selecting, in accordance with the criteria, a second data portion for data movement between the first RAID group and the second RAID group; and responsive to said selecting the second data portion, performing the data movement of the second data portion between the first RAID group and the second RAID group. Each of the first plurality of physical storage devices of the first RAID group may have the first storage capacity that is larger than the second storage capacity of each of the second plurality of physical storage devices of the second RAID group. The criteria may specify that the first RAID group has a first of the plurality of target write workloads and the second RAID group has a second of the plurality of target write workloads, and wherein the first target write workload of the first RAID group may be higher than the second target write workload of the second RAID group. The plurality of target write I/O workloads for the plurality of RAID groups may vary linearly in accordance with storage capacities of physical storage devices of the plurality of RAID groups.

In at least one embodiment, the same read I/O workload range for each of the plurality of RAID groups may indicate that each of the plurality of RAID groups should have approximately a same read I/O workload, within specified limits, independent of capacities of physical drives of the plurality of RAID groups. Processing may include predicting a plurality of read scores for the plurality of RAID groups, wherein each of the plurality of read scores denotes a read score for a different one of the plurality of RAID groups; classifying each of the plurality of read scores corresponding to one of the plurality of RAID groups as balanced or unbalanced, wherein said each read score is balanced if said each read score is within the same target read I/O workload range and wherein said each read score is otherwise unbalanced; determining, in accordance with said classifying, that one of the first RAID group and the second RAID group has an unbalanced read score; and responsive to determining that one of the first RAID group and the second RAID group has an unbalanced read score, performing first processing to alleviate or correct the unbalanced read score, wherein said first processing includes said selecting the first data portion and said performing the data movement of the first data portion.

In at least one embodiment, the criteria may include an idle capacity criterion specifying a plurality of target idle capacity amounts each denoting a target capacity of idle data for an associated one of the plurality of RAID groups, and wherein the plurality of target idle capacity amounts for the plurality of RAID groups may vary in accordance with storage capacities of physical storage devices of the plurality of RAID groups. The plurality of target idle capacity amounts may be a plurality of target idle capacity ranges. Processing may include predicting a plurality of idle capacity scores for the plurality of RAID groups, wherein each of the plurality of idle capacity scores denotes an idle capacity score for a different one of the plurality of RAID groups; and classifying each of the plurality of idle capacity scores corresponding to one of the plurality of RAID groups as balanced or unbalanced, wherein said each idle capacity score is balanced if said each idle capacity score is within a particular one of the plurality of target idle capacity ranges associated with said one RAID group, and wherein said each idle capacity score is otherwise unbalanced. Processing may include determining, in accordance with said classifying, that one of the first RAID group and the second RAID group has an unbalanced idle capacity score; and responsive to determining that one of the first RAID group and the second RAID group has an unbalanced idle capacity score, performing first processing to alleviate or correct the unbalanced idle capacity score. The first processing may include selecting, in accordance with the criteria, a second data portion for data movement between the first RAID group and the second RAID group; and responsive to said selecting the second data portion, performing the data movement of the second data portion between the first RAID group and the second RAID group. Processing may include modeling movement of the first data portion from the first RAID group to the second RAID group.

BRIEF DESCRIPTION OF THE DRAWINGS

Features and advantages of the techniques herein will become more apparent from the following detailed description of exemplary embodiments thereof taken in conjunction with the accompanying drawings in which.

DETAILED DESCRIPTION OF EMBODIMENT(S)

Figure 1:
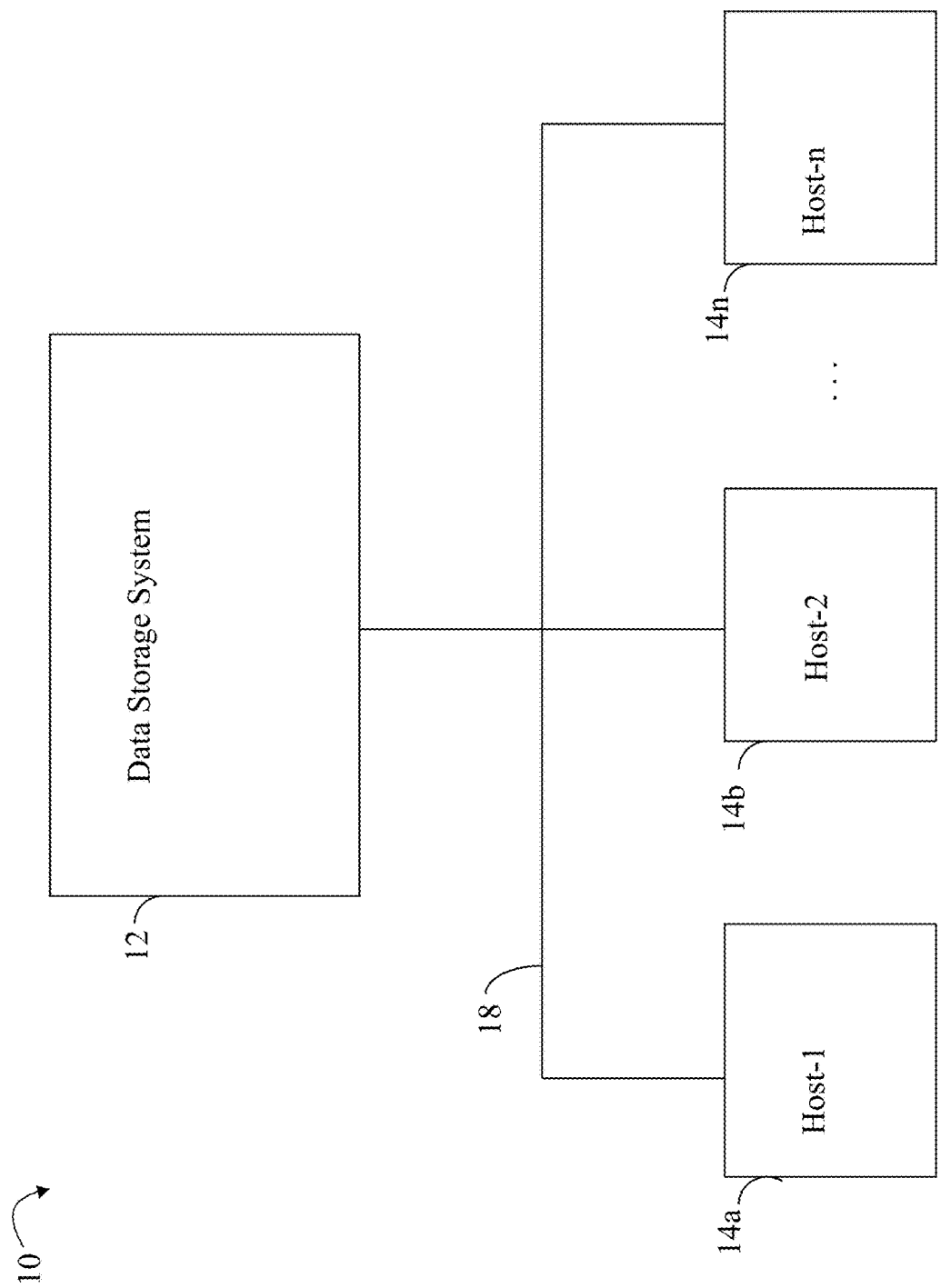
FIG. 1 is an example of an embodiment of a system that may utilize the techniques described herein.

Referring to FIG. 1, shown is an example of an embodiment of a system that may be used in performing the techniques described herein. The system 10 includes a data storage system 12, such as a data storage array, connected to the host systems 14a-14n through the communication medium 18. In this embodiment of the system 10, the N hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connection known in the art. For example, the communication medium 18 may be an intranet, network or other wireless or other hardwired connection(s) by which the host systems 14a-14n may access and communicate with the data storage system 12, and may also communicate with other components included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host computer systems 14a-14n may be any one of a variety of proprietary or commercially available single or multi-processor system, such as an Intel-based processor, or other type of commercially available processor able to support traffic in accordance with each particular embodiment and application.

It should be noted that the particulars of the hardware and software included in each of the components that may be included in the data storage system 12 are described herein in more detail, and may vary with each particular embodiment. Each of the host computers 14a-14n and the data storage system may all be located at the same physical site, or, alternatively, may also be located in different physical locations. The communication medium that may be used to provide the different types of connections between the host computer systems and the data storage system of the system 10 may use a variety of different block-based and/or file-based communication protocols such as TCP/IP, SCSI (Small Computer Systems Interface), Fibre Channel, iSCSI, Fibre Channel over Ethernet, NVMe (Non-Volatile Memory Express) over Fabrics, Network File System (NFS), and the like. Some or all of the connections by which the hosts and the data storage system 12 may be connected to the communication medium 18 may pass through other communication devices, switching equipment that may exist such as a phone line, a repeater, a multiplexer or even a satellite.

Each of the host computer systems may perform different types of data operations. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12. It should be noted that the data storage system 12 of FIG. 1 may physically be a single data storage system, as well one or more other data storage systems as may vary with the embodiment.

Figure 2A:
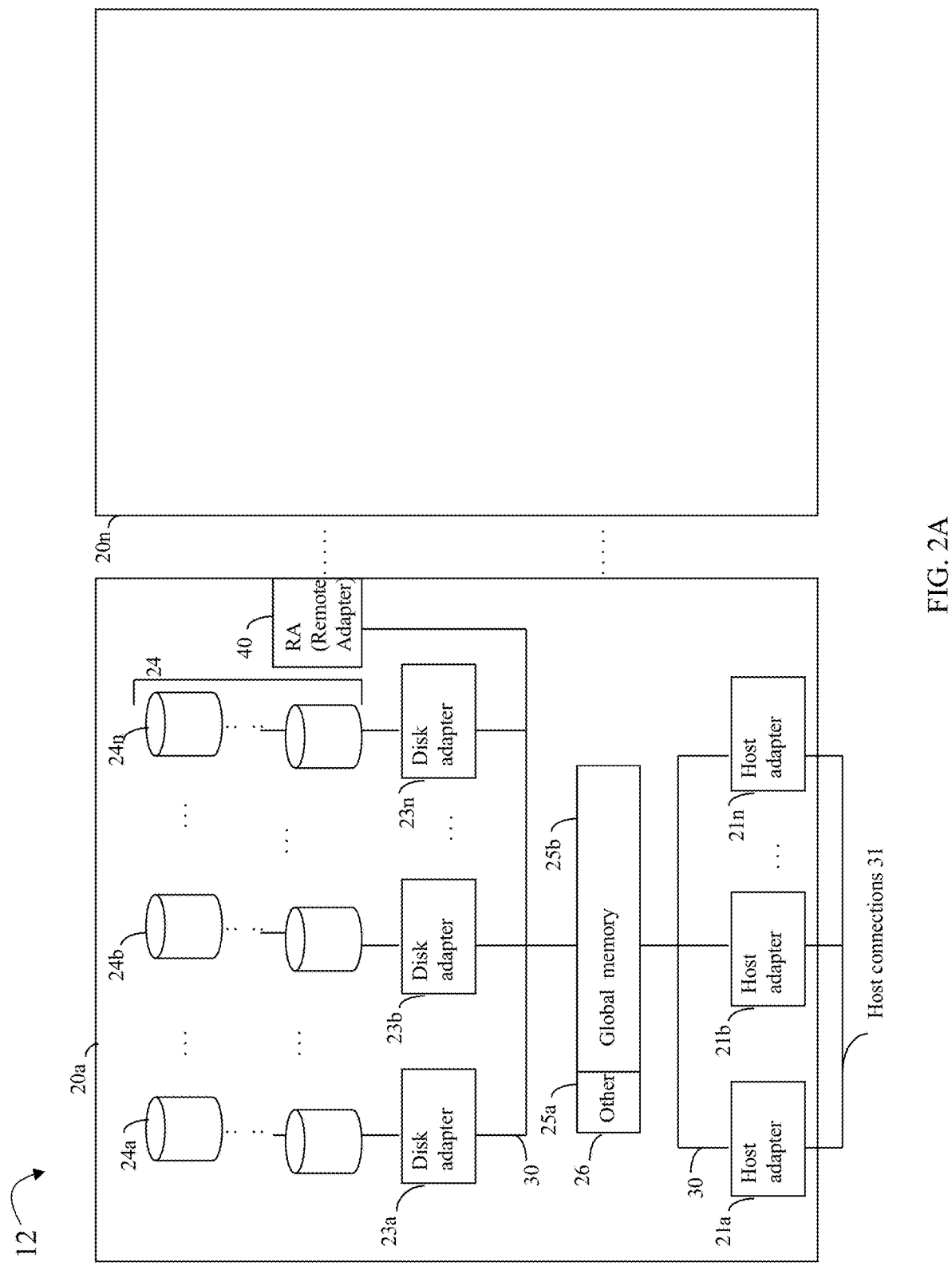
FIG. 2A is an example of an embodiment of a data storage system.

Referring to FIG. 2A, shown is an example of an embodiment of the data storage system 12 that may be included in the system 10 of FIG. 1. Included in the data storage system 12 of FIG. 2A are one or more data storage systems 20a-20n as may be manufactured by one or more different vendors. Each of the data storage systems 20a-20n may be interconnected (not shown). Additionally, the data storage systems may also be connected to the host systems through any one or more communication connections 31 that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage system 12. In this example as described in more detail in following paragraphs, reference is made to the more detailed view of element 20a. It should be noted that a similar more detailed description may also apply to any one or more of the other elements, such as 20n, but have been omitted for simplicity of explanation. It should also be noted that an embodiment may include data storage systems from one or more vendors. Each of the data storage systems 20a-20n may be resources included in an embodiment of the system 10 of FIG. 1 to provide storage services to, for example, the host computer systems. It should be noted that the data storage system 12 may operate stand-alone, or may also be included as part of a storage area network (SAN) that includes other components.

Each of the data storage systems, such as 20a, may include a plurality of disk devices or volumes, such as the arrangement 24 consisting of n rows of disks or more generally, data storage devices, 24a-24n. In this arrangement, each row of the disks may be connected to a disk adapter ("DA") or director responsible for the backend management of operations to and from a portion of the disks 24. In the system 20a, a single DA, such as 23a, may be responsible for the management of a row of disks, such as row 24a. In a data storage system, a backend DA may also be referred to as a disk controller. The DA may perform operations such as reading data from, and writing data to, the physical devices which are serviced by the DA.

It should be noted that, more generally, the physical devices or data storage devices 24a-24n may be any suitable type of physical storage device or media, such as any form of a suitable back-end non-volatile storage device. For example, physical devices included in an embodiment of a data storage system may include one or more types of rotating disk drives (e.g., SATA, SAS, FC 15K RPM, FC 10K RPM), one or more types of flash-based storage devices, or more generally solid state drives (SSDs), such as SSDs that communicate using the NVMe protocol, and the like. An SSD is a data storage device that uses solid-state memory to store persistent data. SSDs may refer to solid state electronics devices as distinguished from electromechanical devices, such as hard drives, having moving parts. Flash devices or flash memory-based SSDs are one type of SSD that contains no moving mechanical parts. The flash devices may be constructed using nonvolatile semiconductor NAND flash memory. The flash devices may include, for example, one or more SLC (single level cell) devices and/or MLC (multi level cell) devices.

Also shown in the storage system 20a is an RA or remote adapter 40. The RA may be hardware including a processor used to facilitate communication between the data storage systems, such as between two of the same or different types of data storage systems.

The system 20a may also include one or more host adapters ("HAs") or directors 21a-21n. Each of these HAs may be used to manage the communications and data operations between one or more host systems and the global memory. In an embodiment, the HA may be a Fibre Channel Adapter (FA) or other adapter which facilitates host communication. Generally, the directors may also be characterized as the different adapters, such as the HAs (including FAs), DAs, RAs and the like, as described herein. Components of the data storage system, such as an HA, which may communicate with a host (e.g., receive the host I/O commands and send the responses to the host) may also be referred to as front end components. A DA is an example of a backend component of the data storage system which may communicate with a front end component. In connection with the data storage systems, various types of directors or adapters may be implemented as a processor, or, more generally, a component that includes the processor. Examples of directors are DAs, HAs, RAs, and the like, such as described herein.

One or more internal logical communication paths may exist between the DAs, the RAs, the HAs, and the memory 26. An embodiment, for example, may use one or more internal busses and/or communication modules. For example, the global memory portion 25b may be used to facilitate data transfers and other communications between the DAs, HAs and RAs in a data storage system. In one embodiment, the DAs 23a-23n may perform data operations using a cache that may be included in the global memory 25b, for example, in communications with other the disk adapters or directors, and other components of the system 20a. The other portion 25a is that portion of the memory that may be used in connection with other designations that may vary in accordance with each embodiment.

The particular data storage system as described in this embodiment, or a particular device thereof, such as a disk, should not be construed as a limitation. Other types of commercially available data storage systems, as well as processors and hardware controlling access to these particular devices, may also be included in an embodiment.

The host systems provide data and access control information through channels to the storage systems, and the storage systems may also provide data to the host systems also through the channels. The host systems do not address the disk drives of the storage systems directly, but rather access to the data may be provided to one or more host systems from what the host systems view as a plurality of logical devices or logical units. A logical unit (LUN) may be characterized as a disk array or a data storage system reference to an amount of disk space that has been formatted and allocated for use by one or more hosts. A logical unit may have a logical unit number that is an I/O address for the logical unit. As used herein, a LUN or LUNs may refer to the different logical units of storage such as logical devices which may be referenced by such logical unit numbers. The LUNs may or may not correspond to the actual or physical disk drives. For example, the one or more LUNs may reside on a single physical disk drive. Data in a single storage system may be accessed by multiple hosts allowing the hosts to share the data residing therein. The HAs may be used in connection with communications between a data storage system and a host system. The RAs may be used in facilitating communications between two data storage systems. The DAs may be used in connection with facilitating communications to the associated disk drive(s) and the LUN(s) residing thereon.

In at least one embodiment, a LUN may a thick or regular LUN in which the physical storage for the full capacity of the LUN may be provisioned when the LUN is created. For a thick LUN, the entire logical address space of the LUN may be mapped to physical storage locations when the LUN is initially created. As a variation in such an embodiment, a LUN may alternatively be a thin LUN or virtually provisioned LUN. With a thin LUN, the physical storage for the LUN may be allocated in chunks, such as slices, on demand the first or initial time there is a write to a logical address portion that is mapped to a particular slice. A logical address portion that is mapped to a slice of physical storage may or may not include data stored in the entire logical address portion. Thus, at any point in time, a physical storage slice that is mapped to a logical address portion or subrange of a thin LUN may include data stored on various portions of the slice depending on what particular logical addresses mapped to the slice have been written to. In at least one embodiment, both thick or regular LUNs and thin or virtually provisioned LUNs may be supported and thus configured in the data storage system.

Accordingly, a thin LUN presents a logical storage space to one or more clients, such as applications running on a host, where different portions of the logical storage space may or may not have corresponding physical storage space associated therewith. However, the thin LUN is not mapped directly to physical storage space. Instead, portions of the thin LUN for which physical storage space exists are mapped to data devices, which are logical devices that map logical storage space of the data device to physical storage space on the disk drives or other physical storage devices. Thus, an access of the logical storage space of the thin LUN results in either a null pointer (or equivalent) indicating that no corresponding physical storage space has yet been allocated, or results in a reference to a data device which in turn references the underlying physical storage space.

Thin LUN and thin provisioning are described in more detail in U.S. patent application Ser. No. 11/726,831, filed Mar. 23, 2007 (U.S. Patent App. Pub. No. 2009/0070541 A1), AUTOMATED INFORMATION LIFE-CYCLE MANAGEMENT WITH THIN PROVISIONING, Yochai, EMS-147US, and U.S. Pat. No. 7,949,637, Issued May 24, 2011, Storage Management for Fine Grained Tiered Storage with Thin Provisioning, to Burke, both of which are incorporated by reference herein.

The DA physically accesses the back-end non-volatile storage devices, such as the physical data storage devices (PDs) denoted by 24 of FIG. 2A. Data residing on a PD may be accessed by the DA following a data request in connection with I/O operations that other directors originate. In at least one embodiment, write data received at the data storage system from a host or other client may be initially written to a cache memory (e.g., such as may be included in the component designated as 25b) and marked as write pending. Once written to the cache, the host may be notified that the write operation has completed. At a later point time, the write data may be destaged from the cache to the physical storage device, such as the non-volatile physical storage device (e.g., the PDs of 24) accessed by a DA. In connection with reads, processing may include first looking to see if the requested read data is in the cache whereby a read hit occurs. For a read hit, the read is serviced using the cached copy of the requested read data by returned the cached read data to the requester. Thus, with a read hit, there is no need to access the physical (back end) non-volatile storage by the DA to obtain the requested read data thereby resulting in a faster read I/O response time (RT). If the requested read data is not in the cache, the requested read data is obtained from the physical (back end) non-volatile storage by the DA where the read data is then stored in the cache, and returned to the requester. The cached copy of the read data may then be available to further service any other subsequent reads. As known in the art, any suitable cache management technique may be used to maintain the cache, for example, such as in determining how long data remains in the cache, whether to prefetch data, selecting data stored in the cache for eviction, and the like.

Figure 2B:
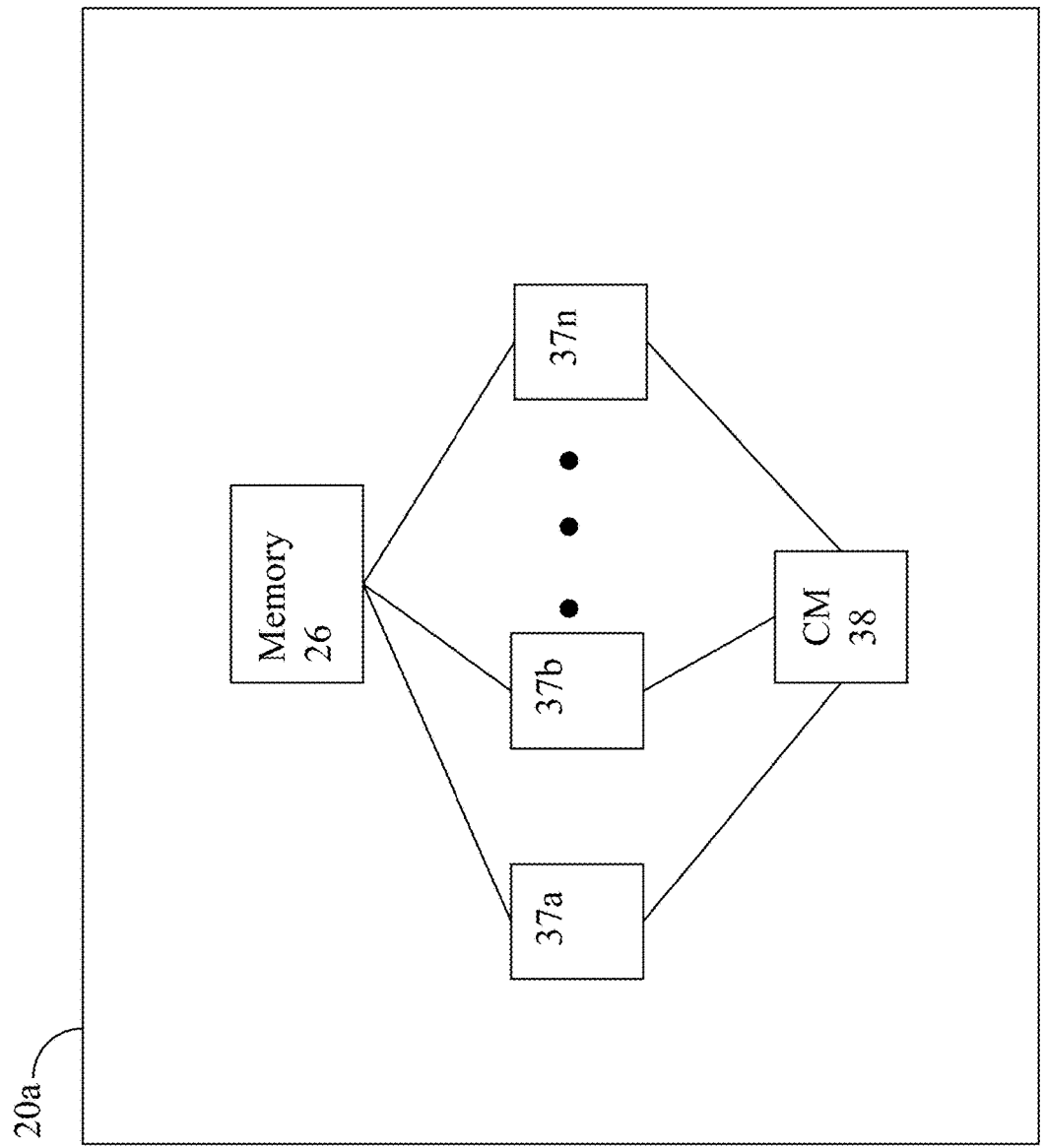
FIG. 2B is a representation of the logical internal communications between the directors and memory included in one embodiment of the data storage system of FIG. 2A.

Referring to FIG. 2B, shown is a representation of the logical internal communications between the directors and the memory included in a data storage system. Included in FIG. 2B is a plurality of directors 37a-37n coupled to the memory 26. Each of the directors 37a-37n represents one of the HAs, RAs, or DAs that may be included in a data storage system. Each of the directors may be, for example, a processor or a printed circuit board that includes a processor and other hardware components. The representation of FIG. 2B also includes an optional communication module (CM) 38 that provides an alternative communication path between the directors 37a-37n. Each of the directors 37a-37n may be coupled to the CM 38 so that any one of the directors 37a-37n may send a message and/or data to any other one of the directors 37a-37n without needing to go through the memory 26. The CM 38 may be implemented using conventional MUX (multiplexer)/router technology where a sending one of the directors 37a-37n provides an appropriate address to cause a message and/or data to be received by an intended receiving one of the directors 37a-37n. In addition, a sending one of the directors 37a-37n may be able to broadcast a message to all of the other directors 37a-37n at the same time.

A host may be able to access data, such as stored on a LUN of a data storage system, using one or more different paths from the host to the data storage system. A data storage system device, such as a LUN, may be accessible over multiple paths between the host and data storage system. Thus, a host may select one of possibly multiple paths over which to access data of a storage device.

It should be noted that the particular exemplary architecture of a data storage system such as, for example, in FIGS. 2A and 2B is merely illustrative of one such architecture that may be used in connection with the techniques herein. Those skilled in the art will appreciate that the techniques herein may be used with any suitable data storage system. For example, FIG. 2B provides an example of components that may be included in a separate physical fabric used for control communications sent between components of the data storage system. Some embodiments may use separate physical fabrics for each of data movement and control communications between data storage system components. Alternatively, some embodiments may use a same shared physical fabric for both data movement and control communication functionality rather than have a separate control communications fabric such as illustrated in FIG. 2B.

In an embodiment of a data storage system in accordance with the techniques herein, the components such as the HAs, the DAs, and the like may be implemented using one or more "cores" or processors each having their own memory used for communication between the different front end and back end components rather than utilize a global memory accessible to all storage processors.

It should be noted that although examples of the techniques herein may be made with respect to a physical data storage system and its physical components (e.g., physical hardware for each HA, DA, HA port and the like), techniques herein may be performed in a physical data storage system including one or more emulated or virtualized components (e.g., emulated or virtualized ports, emulated or virtualized DAs or HAs), and also a virtualized or emulated data storage system including virtualized or emulated components.

The data path or I/O path may be characterized as the path or flow of I/O data through a system. For example, the data or I/O path may be the logical flow through hardware and software components or layers in connection with a user, such as an application executing on a host (e.g., more generally, a data storage client) issuing I/O commands (e.g., SCSI-based commands, and/or file-based commands) that read and/or write user data to a data storage system, and also receiving a response (possibly including requested data) in connection such I/O commands.

The data path or I/O path may be contrasted with a control path. The data or I/O path and the control path define two sets of different logical flow paths. The control path, also sometimes referred to as the management path, may be characterized as the path or flow of data management or control commands through a system. For example, the control or management path may be the logical flow through hardware and software components or layers in connection with issuing data storage management command to and/or from a data storage system, and also receiving responses (possibly including requested data) to such control or management commands. For example, with reference to the FIG. 1, the control commands may be issued from the data storage management software, such as a data storage system management application, executing on a management system, such as another computer system or other device with a processor that is connected to the data storage system 12. Such commands may be, for example, to establish or modify data services; view performance or health of various system components and storage entities; provision storage; perform user account management; provision storage; create, modify or delete a logical storage entity; and the like. For example, commands may be issued over the control path to provision storage for LUNs; create a storage group (SG) which is a logically defined group of one or more LUNs; modify an existing SG such as by adding or removing LUNs; create a snapshot; define conditions of when to create another snapshot; define or establish local and/or remote replication services; define or modify a schedule for snapshot or other data replication services; create or configure a new RAID group; obtain data storage management and configuration information for display in a graphical user interface (GUI) of a data storage management program or application; generally modify one or more aspects of a data storage system configuration; view properties, performance, and/or status information regarding LUNs or other storage objects (e.g., physical and/or logical entities in the data storage system); and the like.

Data storage systems may include different storage tiers having different types of non-volatile storage media. For example, consistent with other description herein, in at least one embodiment, the data storage system may include one or more tiers of rotating disk drives and include a tier of SSD drives (e.g., flash-based storage drives). Data portions of LUNs may be proactively moved or relocated between different storage tiers. For example, consider a multi-tiered storage system with 3 storage tiers—an SSD tier of flash-based drive, a tier of 15K RPM rotating disk drives and a tier of 10K RPM rotating disk drives. The foregoing 3 storage tiers may be ranked based on performance where the SSD tier may be ranked as the highest, the tier of 15K RPM drives ranked second highest and the tier of 10K RPM dries ranked lowest/least in terms of performance. A data portion, such as mapped to a subrange of a LUN logical address space, may be relocated between different ones of the foregoing 3 tiers in an automated fashion based on, for example, the temperature or frequency of access of I/Os to the data portion at various points in time. At a first point in time, the data portion may be accessed frequently for reading and/or writing and may be stored in the SSD tier. At a second later point in time, the data portion's frequency of access may be greatly reduced (e.g., idle) and may be relocated, via demotion, from the SSD tier to a lower performing tier, such as the 10K or 15K RPM tier. At yet a third point in time subsequent to the second point in time, the data portion may be frequently accessed again and may be promoted to a higher performing tier (e.g., relocated from the 10K or 15K RPM tier to the SSD tier). In at least one embodiment, the data storage system may include multiple SSD tiers of non-volatile storage where each of the SSD tiers has different characteristics that affect latency when accessing the physical storage media to read or write data.

In an embodiment in accordance with techniques herein, each storage tier may include PDs of a particular media type or technology (e.g., MLC flash drives, SLC flash drives, 10K RPM drives, 15K RPM drives, 7.2K RPM drives) configured into one or more RAID groups having an associated RAID protection type or level and configuration. Thus, a physical storage location or allocation within a storage tier may be characterized as having a first dimension denoting the media type or technology of the PDs in the storage tier and a second dimension denoting the RAID type or level (e.g., RAID-1, RAID-5, RAID-6) and configuration (e.g., of the RAID group such as RAID-5 with 3×1 (3 data drives and 1 parity drive) or 7×1 (7 data drives and 1 parity drive). In at least one embodiment, all PDs in the same tier may be configured into one or more RAID groups where each such RAID group of the same tier has the same RAID level and configuration.

Figure 3:
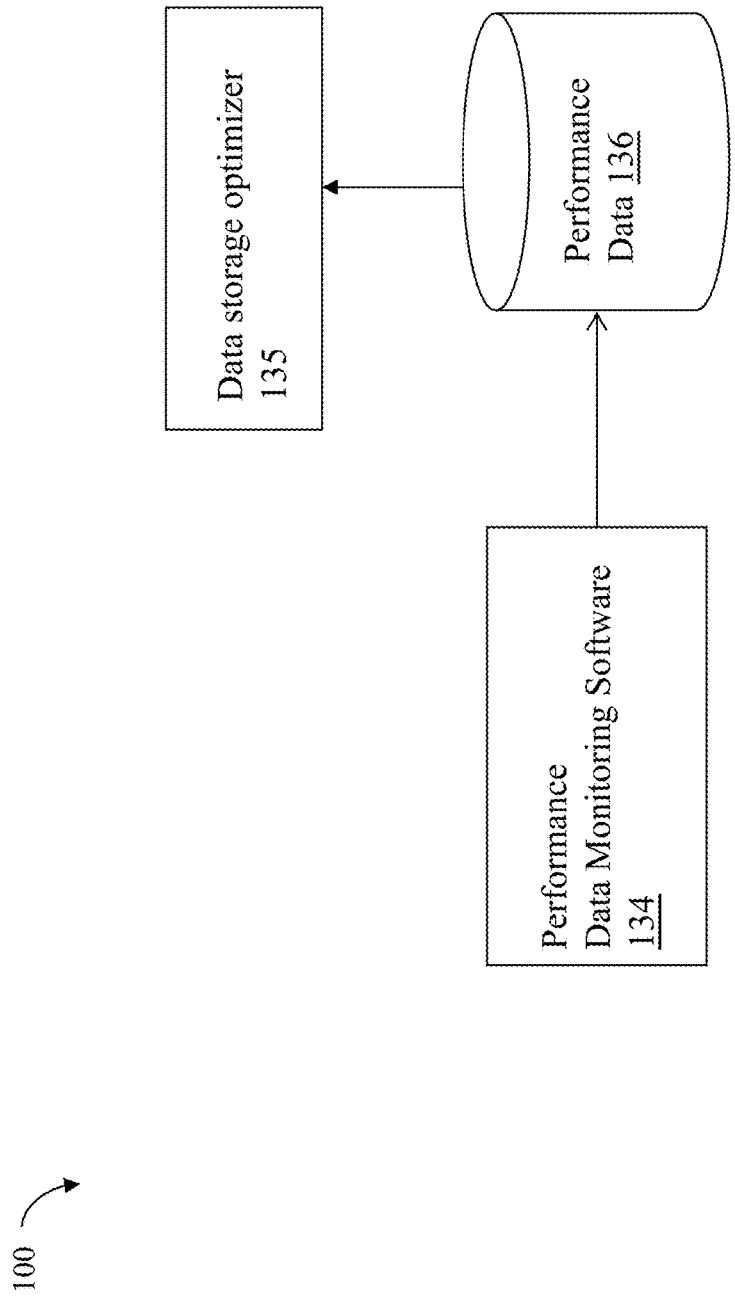
FIG. 3 is an example of components that may be included in an embodiment in accordance with the techniques herein.

Referring to FIG. 3, shown is an example 100 of components that may be used in an embodiment in connection with techniques herein. The example 100 includes performance data monitoring software 134 which gathers performance data about the data storage system. The software 134 may gather and store performance data 136. This performance data 136 may also serve as an input to other software, such as used by the data storage optimizer 135 in connection with performing data storage system optimizations, which attempt to enhance the performance of I/O operations, such as those I/O operations that are sent from a host to the data storage system, where such I/O operations are directed to LUNs. For example, the performance data 136 may be used by the data storage optimizer 135 in an embodiment in accordance with techniques herein. The performance data 136 may be used in determining and/or optimizing one or more statistics or metrics such as may be related to, for example, an I/O workload for one or more PDs, a pool or group of PDs, logical devices or volumes (e.g., thin or thick LUNs), and the like. The I/O workload may also be a measurement or level of "how busy" a device is, for example, in terms of I/O operations (e.g., I/O throughput such as number of I/Os/second, response time (RT), and the like).

It should be noted that the operations of read and write with respect to a LUN, thin device, and the like, may be viewed as read and write requests or commands from a back-end I/O perspective or a front-end I/O perspective. In connection with a back-end I/O perspective, the backend (BE) I/O workload may be based on I/Os from a DA that, as described herein, may be controller or other backend PD interface. Thus, these BE workload I/O operations are operations that may also be characterized as a number of operations with respect to the PD (e.g., number of physical device reads, writes, and the like, based on physical device accesses). This is in contrast to a front-end I/O perspective, for example, in connection with observing or counting a number of particular type of I/O requests (e.g., reads or writes) as issued from the host and received by a front end component such as an HA 21. To illustrate, a host read request may not result in a read request or command issued to the DA if there is a cache hit and the requested data is in cache. The host read request results in a read request or command issued to the DA to retrieve data from the PD only if there is a read cache miss. Furthermore, when writing data of a received host I/O request to the physical device, the host write request may result in multiple reads and/or writes by the DA in addition to writing out the host or user data of the request. For example, if the data storage system implements a RAID data protection technique, such as RAID-5, additional reads and writes may be performed such as in connection with writing out additional parity information for the user data. Thus, in at least one embodiment, observed data gathered to determine workload, such as observed numbers of reads and writes, may refer to the back-end perspective read and write requests or commands performed by the DA. Such read and write commands may correspond, respectively, to physical device accesses such as disk reads and writes that may result from a host I/O request received by an HA 21.

The optimizer 135 may perform processing to determine how to allocate or partition physical storage of the PDs in a multi-tiered environment for use by multiple applications. The optimizer 135 may also perform other processing such as, for example, to determine what particular portions of LUNs to store on PDs of a particular tier, evaluate when to move data between different storage tiers, and the like. It should be noted that the optimizer 135 may generally represent one or more components that perform processing as described herein as well as one or more other optimizations and other processing that may be performed in an embodiment.

In an embodiment, the system described herein may be used in connection with an embodiment of a data storage optimizer that provides for the optimization of the use of different storage tiers including transparently automating the control, placement, and movement of data between different storage tiers as well as movement of data portions between PDs in the same tier.

In at least one embodiment, the logical address space of LUN may be partitioned into multiple logical address space portions, where each such portion denotes a sub-LUN portion that maps to a subrange of less than the entire logical address space of the LUN. The size of each data portion, sometimes referred to a slice, extent or chunk, mapped to one of the logical address space portions may correspond to the data movement granularity size that may vary with embodiment. The data storage optimizer may perform data movements of data portions each having the data movement granularity size. Also depending on embodiment, each of the data portions moved or placed by the optimizer may have the same size or may be of different supported data movement granularity sizes.

In a data storage system, the amount of time spent taken to access the PDs to read and write data may be the most significant contributor to I/O response time (RT). Described herein are techniques that may be used to ensure that I/O workload is distributed across PDs of the different storage tiers with a goal of improved I/O RT. The techniques herein may be used in connection with a storage tier including PDs having different capacities. For example, a storage tier may include multiple RAID groups, where a first of the multiple RAID groups includes PDs each having a first capacity, and where a second of the multiple RAID groups includes PDs each having a second capacity that is different than the first capacity. The techniques herein may be used in connection with the storage tier of different capacity PDs without the risk of concentrating all types of I/O workload on the larger capacity PDs which may adversely affect I/O RT performance with respect to data stored on the larger capacity PDs.

Described herein are techniques that may be used in connection with PDs having varying capacities where such PDs may be included in the same tier, such as the same tier of flash PDs or other drive technology or type, providing backend non-volatile storage in a data storage system. In at least one embodiment, the tier may be configured into multiple RAID groups, where a first of the multiple RAID groups includes PDs each having a first capacity, and where a second of the multiple RAID groups includes PDs each having a second capacity that is different than the first capacity.

The techniques herein specify criteria for data placement to particular PDs of the tier based on read workload criteria, write workload criteria and idle capacity criteria. The criteria may include read workload criteria specifying that all PDs in the tier, and thus across all RAID groups of the same tier, should have a similar (e.g., within specified tolerance or limits) read I/O workload independent of PD capacity. For example, both a 2 TB flash PD and a 4 TB flash PD of the same tier should have similar read I/O workloads, such as a similar amount of read I/Os per second (IOPs). In at least one embodiment, the read workload criteria may specify a same read workload target or goal for all RAID groups in the tier.

The criteria may include write workload criteria specifying that a larger capacity PD may have a larger write I/O workload, such as write IOPs, than a smaller capacity PD. In at least one embodiment, the write workload criteria may specify write I/O workload targets for the RAID groups where the write I/O workload targets may scale linearly in accordance with the capacity of PDs in the RAID groups.

The criteria may bias toward storing more idle data on the larger capacity PDs of the tier such as to balance out placement of data portions on the larger PDs having the additional write workload. The larger capacity PD may have more of its capacity consumed for storing idle data without further increasing the overall workload directed to the larger capacity PD. The criteria may include idle capacity criteria specifying that a larger capacity PD may have a larger amount of its capacity used for storing idle data than a smaller capacity PD. In at least one embodiment, the idle capacity criteria may specify idle capacity targets for the RAID groups where the idle capacity targets may scale linearly in accordance with the capacity of PDs in the RAID groups.

Such criteria may be used for selective data placement on PDs of the same tier in order to direct varying amounts of the different I/O workload types to the PDs that result in improved PD I/O performance. Use of such criteria in an embodiment may provide for improved I/O RT by increasing the I/O performance of the backend PDs.

The foregoing and other aspects of the techniques herein are described in more detail in following paragraphs.

Figure 4:
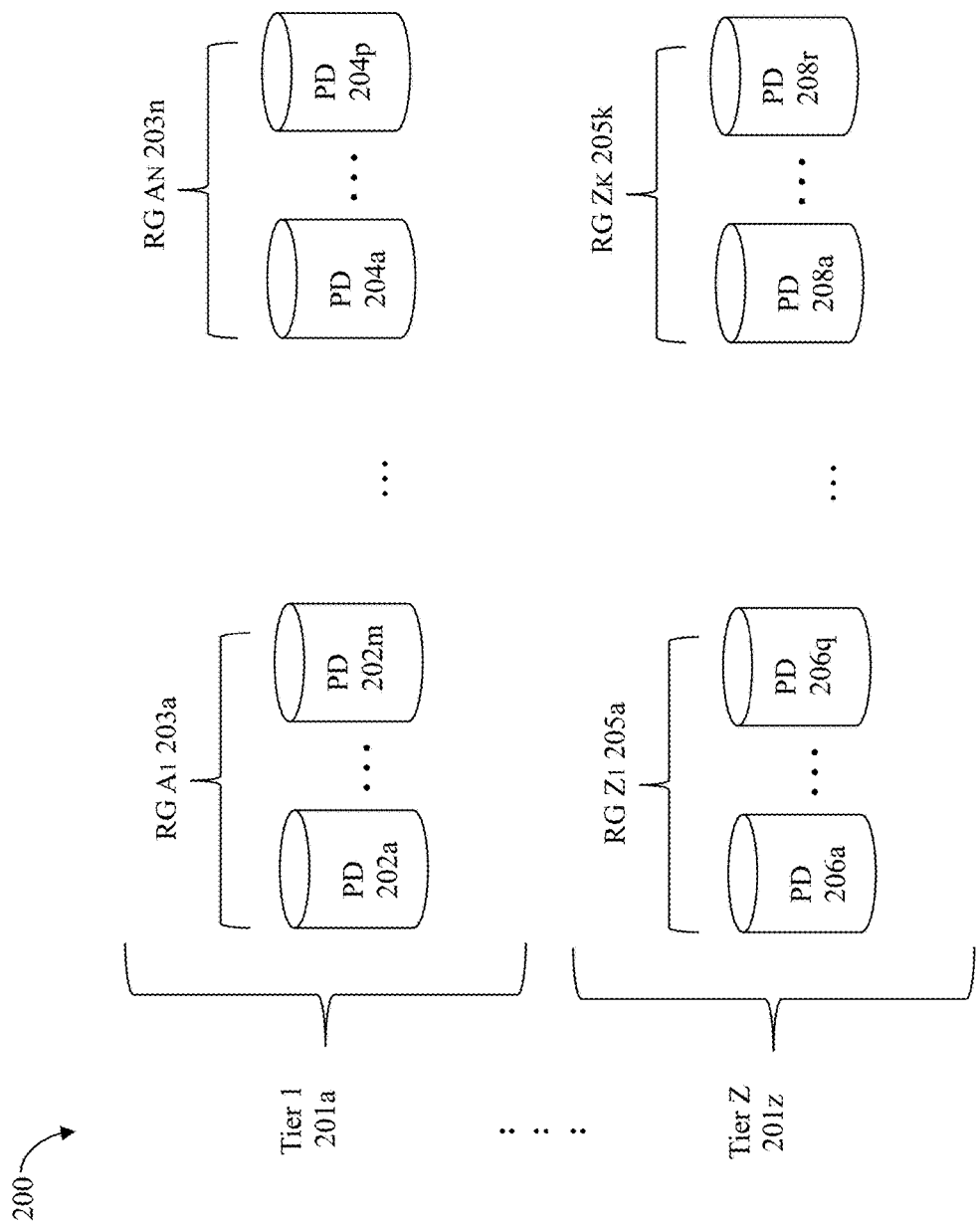
FIG. 4 is an example of storage tiers of RAID groups that may be included in an embodiment in accordance with the techniques herein.

Referring to FIG. 4, shown is an example of storage tiers that may be included in an embodiment of the data storage system in accordance with the techniques herein. The example 200 includes Z storage tiers, where Z may be any suitable number of tiers. The tier 1 201a includes RAID groups RG 203a-n. Each single one of the RAID groups RG 203a-n may include PDs having the same storage capacity. For example, the PDs 202a-m of the RG 203a each have the same first storage capacity, and the PDs 204a-p of the RG 203n each have the same second storage capacity. However, the PDs of the RG 203a may have a different storage capacity than the PDs of the RG 203n, whereby the first storage capacity and the second storage capacity are different. In this manner, the PDs of the tier 1 201a may include the PDs having various storage capacities, where the PDs having a same storage capacity may be configured into a RAID group of the tier 201a. For example, the PDs 202a-m of the RG 203a may each be 2 TB in size, and the PDs 204a-p of the RG 203n may each be 4 TB in size.

The tier Z 201z includes the RAID groups RG 205a-k. Each single one of the RAID groups RG 205a-k may include PDs having the same storage capacity. For example, the PDs 206a-q of the RG 205a each have the same third storage capacity, and the PDs 208a-r of the RG 205k each have the same fourth storage capacity. However, the PDs of the RG 205a may have a different storage capacity than the PDs of the RG 205k, whereby the third storage capacity and the fourth storage capacity are different. In this manner, the PDs of the tier Z 201z may include PDs having various storage capacities, where the PDs having a same storage capacity may be configured into a RAID group of the tier 201z. For example, the PDs 2-6a-q of the RG 205a may each be 4 TB in size, and the PDs 208a-r of the RG 205k may each be 8 TB in size.

Figure 5:
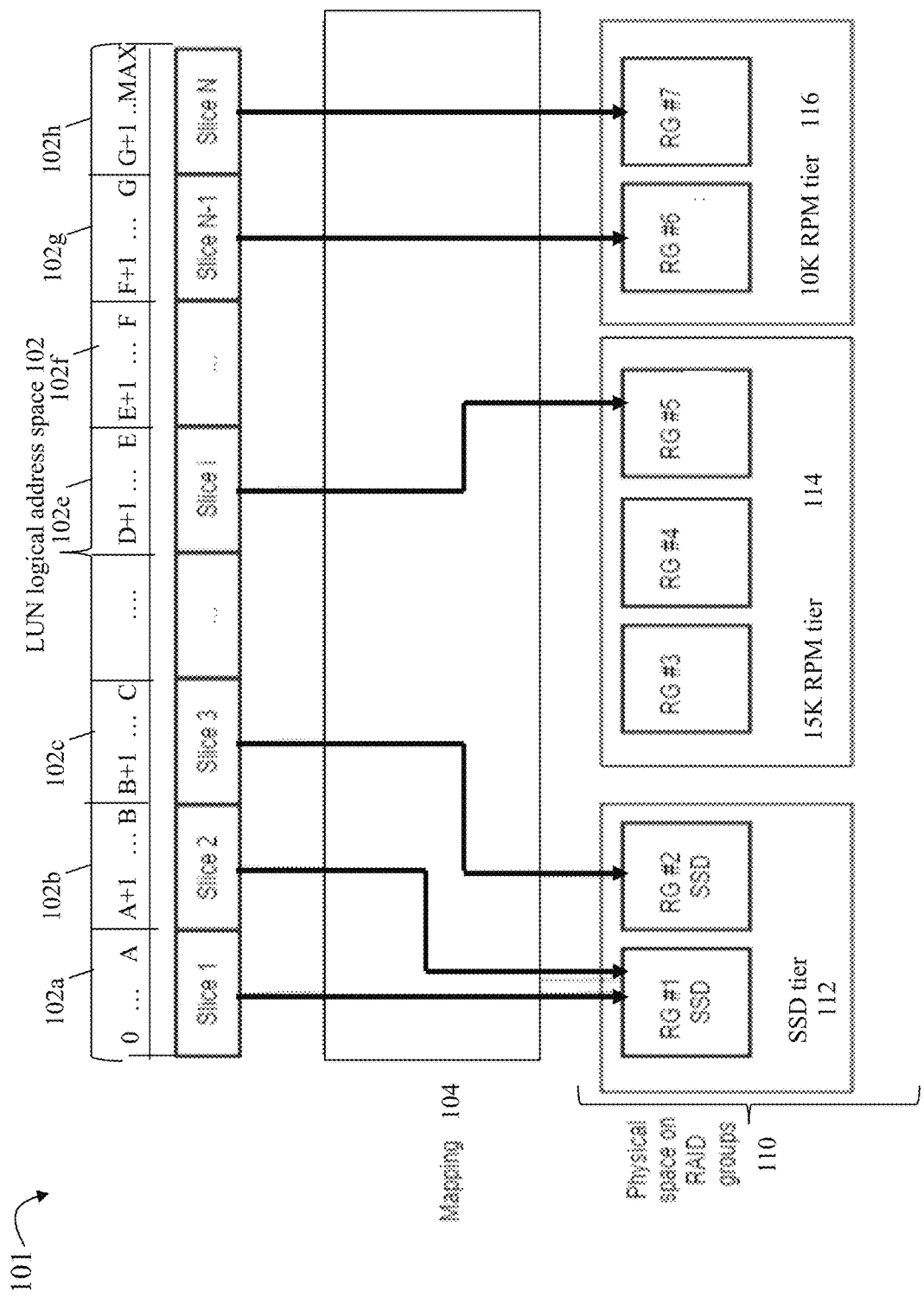
FIG. 5 is an example illustrating a mapping of a logical address space to physical storage in an embodiment in accordance with the techniques herein.

Referring to FIG. 5, shown is an example illustrating a logical to physical mapping in a data storage system. The example 101 illustrates how the logical address space or range of a LUN 102 is mapped via the mapping layer 104 to different slices, segments or more generally, portions of physical memory of non-volatile PDs (110) providing back-end data storage as described elsewhere herein. The example 101 includes the storage tiers 112 (SSD tier), 114 (15K RPM tier) and 116 (10K RPM tier) comprising the PDs 110 as noted above. The element 102 may denote the LUN's logical address space, having a starting logical address, block or offset of 0, and an ending maximum logical address, MAX. The LUN's logical address space 102 in the example 100 is partitioned into equal logical address space portions (denoted by 102a-h) where each of the portions 102a-h is mapped to region of physical storage, also referred to as slices or segments, on the different PDs of different ones of the storage tiers of 110. As noted above, data storage system software may periodically remap portions of the LUN's logical address space by performing data movements keep the data of the most actively used or accessed portions of 102a-n on slices, segments or portions of the highest performance tier 112 in efforts to maximum data storage system I/O performance. As shown in FIG. 5, the PDs of the tiers 112, 114 and 116 may be configured into RAID groups (denoted as RG #1-7 in FIG. 5) each having a suitable RAID level to provide data protection. In connection with the example 101 and with reference back to FIG. 4, each of the RGs #1-#7 may correspond to one of the RGs in one of 3 storage tiers where, for example, the RG #1 may include PDs that are a first storage capacity or size, RG #2 may include PDs that are a second storage capacity or size, the RG #3 may include PDs that are a third storage capacity or size, the RG #4 may include PDs that are a fourth storage capacity or size; the RG #5 may include PDs that are a fifth storage capacity or size, the RG #6 may include PDs that are a sixth storage capacity or size, and the RG #7 may include PDs that are a seventh storage capacity or size.

In an embodiment in accordance with the techniques herein, processing may be performed to select data portions for movement or placement among PDs of the same tier. In at least one embodiment, the data storage optimizer may also perform such data movements among PDs of the same tier as described in more detail elsewhere herein.

It should be noted that an embodiment in accordance with the techniques herein may generally include one or more storage tiers although figures and discussion herein also describe embodiments that may include multiple storage tiers.

With reference to the example 101 of FIG. 5, each of 102a-h may denote a data portion stored in the LUN's logical address space that may be a data movement candidate in accordance with the techniques herein. In this example, each of the data portions 102a-h (sometimes referred to herein as extents) may be the same size denoting the data movement size granularity of a sub-LUN data portion. An embodiment in accordance with the techniques herein may track various I/O workload statistics for each such extent or data portion 102a-h stored in a LUN's logical address space. In at least one embodiment, the I/O workload statistics tracked per extent or data portion may include at least one read I/O workload statistic, such as read I/Os per second (IOPS) directed to the particular extent of data; and at least one write I/O workload statistic, such as write IOPS directed to the particular extent of data. An extent or data portion may be characterized as having idle workload if the total I/O workload, of both read and write I/Os, directed to the extent or data portion is 0, or more generally, below some specified minimum activity level.

It should be noted that the data movement size granularity and physical storage allocation size granularity may be different from the size of an extent for which statistics are tracked. For example, in at least one embodiment, the data movement size granularity and physical storage allocation size granularity may be less than a single extent or data portion for which the various I/O workload statistics are tracked for use with the techniques herein. In this case, a single extent may include may to a subrange of a LUN's logical address space, where the subrange may include address space holes that are unallocated and do not map to physical storage. In this case the I/O workload statistics for a single data portion or extent may denote the I/Os directed to the allocated subportions of the single data portion or extent.

In at least one embodiment, the I/O workload captured in connection with the I/O workload statistics of each extent may be the back-end (BE) I/O workload statistics discussed elsewhere herein based on I/Os issued by the DAs to the PDs. The BE I/O workload statistics denoting the I/O workload statistics of the extents used in connection with the techniques described in following paragraphs may be determined periodically, such per sampling period or time period. Consistent with description elsewhere herein, data movements such as performed by the data storage optimizer may be modeled for RAID groups, as well as per PD, per extent and the like (e.g., generally per storage entity), to predict, forecast or model the performance of such storage entities if selected one or more candidate data movements are performed. As described elsewhere herein, the forecasted, predicted or modeled performance expected for a candidate data movement may be modeled by accordingly modeling the proposed shift or change of the BE I/O workload. For example, modeling movement of a data portion from the tier 1 to the tier 2, from the RAID group A to the RAID group B, or from the PD1 to the PD2 may include modeling movement or shifting the data portion's capacity and I/O workload from, respectively, the tier 1 to the tier 2, the RAID group 1 to the RAID group 2, or the PD1 to the PD2.

At least one embodiment in accordance with techniques herein may use a time-series exponential smoothing model with a smoothing or decay constant Alpha, such as the exponential moving average (EMA) used in EQUATION D1 below. Different suitable values for Alpha may be selected and used in EQUATION D1 with different statistics depending on the reactiveness or speed with which the predicted, forecasted or modeled statistics change over time in accordance with changes in actual or observed statistic values over time. Such values for Alpha may be accordingly adjusted to give appropriate weight to actual or observed statistic values and predicted statistic values.

In at least one embodiment in accordance with techniques herein, the statistic may generally be any desired I/O workload or performance based statistic such as denoting read I/O workload, write I/O workload, and the like. Examples of different statistics that may be used in connection with EQUATION D1 are described elsewhere herein. For example, consider a write I/O workload as the statistic for a storage entity, such as an extent, or a single PD. The predicted or forecasted statistic for a next time period "t+1" may be determined in accordance with both the actual or measured statistic value from the previous time period "t" and also the predicted or forecasted statistic value from the previous time period "t". The predicted statistic for time period "t+1" may be a time series exponential smoothing model using a smoothing or decay constant "Alpha". In such an embodiment in accordance with techniques herein, $F_{t+1}$, denoting the predicted or forecasted statistic for a storage entity determined for a sampling period t+1, may be expressed as follows in EQUATION D1:

$$F_{t+1} = (Alpha * A_t) + ((1-Alpha) * F_t)$$ EQUATION D1 where

"At" is the actual observed or measured statistic for the storage entity for the sampling period "t";

"Alpha" is the decay coefficient;

"$F_t$" is the forecasted or predicted statistic value for the storage entity for the sampling period "t"; and "$F_{t+1}$" is the forecasted or predicted statistic value for the storage entity as calculated based on EQUATION D1 for the next sample period "t+1".

Generally, Alpha is a decay coefficient or smoothing constant selected accordingly to give a desired amount of weight to the actual measured statistic value for a time period "t" and where 1−Alpha thus denotes the desired amount of weight given to the predicted or forecasted statistic value for the time period "t", where both such values At and Ft are used in determining Ft+1, the next predicted, forecasted or modeled statistic value for the next time period "t+1". As can be seen in EQUATION D1, the closer the decay coefficient Alpha is to zero, the lesser the weight given to At, the actual measured statistic value for time period "t" and thus the greater the weight given to Ft, the predicted statistic value for time period "t".

An embodiment in accordance with techniques herein may collect statistics for each extent, or more generally each data portion, as described in more detail elsewhere herein.

It should be noted that although the techniques described herein are used with thin LUNs providing virtual storage provisioning, the techniques herein may also be used in connection with other types of suitable devices such as those not providing virtual provisioning.

For simplification of illustration, following examples refer to particular numbers of RAID groups in a storage tier. More generally, the techniques herein may be used with any suitable number of RAID groups of a storage tier and where the PDs of the storage tier have generally two or more different capacities and where each RAID group of the storage tier is configured using PDs of the same capacity. In at least one embodiment, a read score, a write score, and an idle capacity score may be determined for each RAID group of the tier. The read score for a RAID group (RG) may be determined using EQUATION D1. The read score may denote a predicted or forecasted read I/O workload for the RG determined using one or more read workload statistics, such as read IOPs directed to the RG. The read workload statistics used may denote the aggregate or collective read workload of data portions stored on PDs of the RG such as based on I/O workload statistics tracked for each data portion or extent.

The write score for a RAID group (RG) may be determined using EQUATION D1. The write score may denote a predicted or forecasted read I/O workload for the RG determined using one or more write workload statistics, such as write IOPs directed to the RG. The write workload statistics used may denote the aggregate or collective write workload of data portions stored on PDs of the RG such as based on I/O workload statistics tracked for each data portion or extent.

The idle capacity score for a RAID group (RG) may denote a predicted or forecasted amount of storage capacity of the RG used for storing idle data. In at least one embodiment, the idle capacity score may be determined in accordance with EQUATION D1. The idle capacity score for an RG may denote the total size or capacity of idle extents stored on the PDs of the RG. When the total workload of a data portion or extent is idle, or generally below a specified minimum activity or workload threshold, the extent may be characterized as idle, and the extent's capacity may be included in the aggregate or total capacity of the RG storing idle data. For example, if there are 10 idle extents stored in an RG where each extent has a size of 10 MB (megabytes), the idle capacity of the RG at that point in time is 100 MB. The idle capacity score for the RG may be determined as an exponentially smoothed value, such as an EMA using EQUATION D1, where the 100 MB at one point in time "t" is used, along with prior recorded idle capacities for the RG at prior points in time, in predicting or forecasting the amount of idle capacity of the RG as time "t+1". The foregoing forecasted or predicted idle capacity may be the idle capacity score in at least one embodiment.

Figure 6:
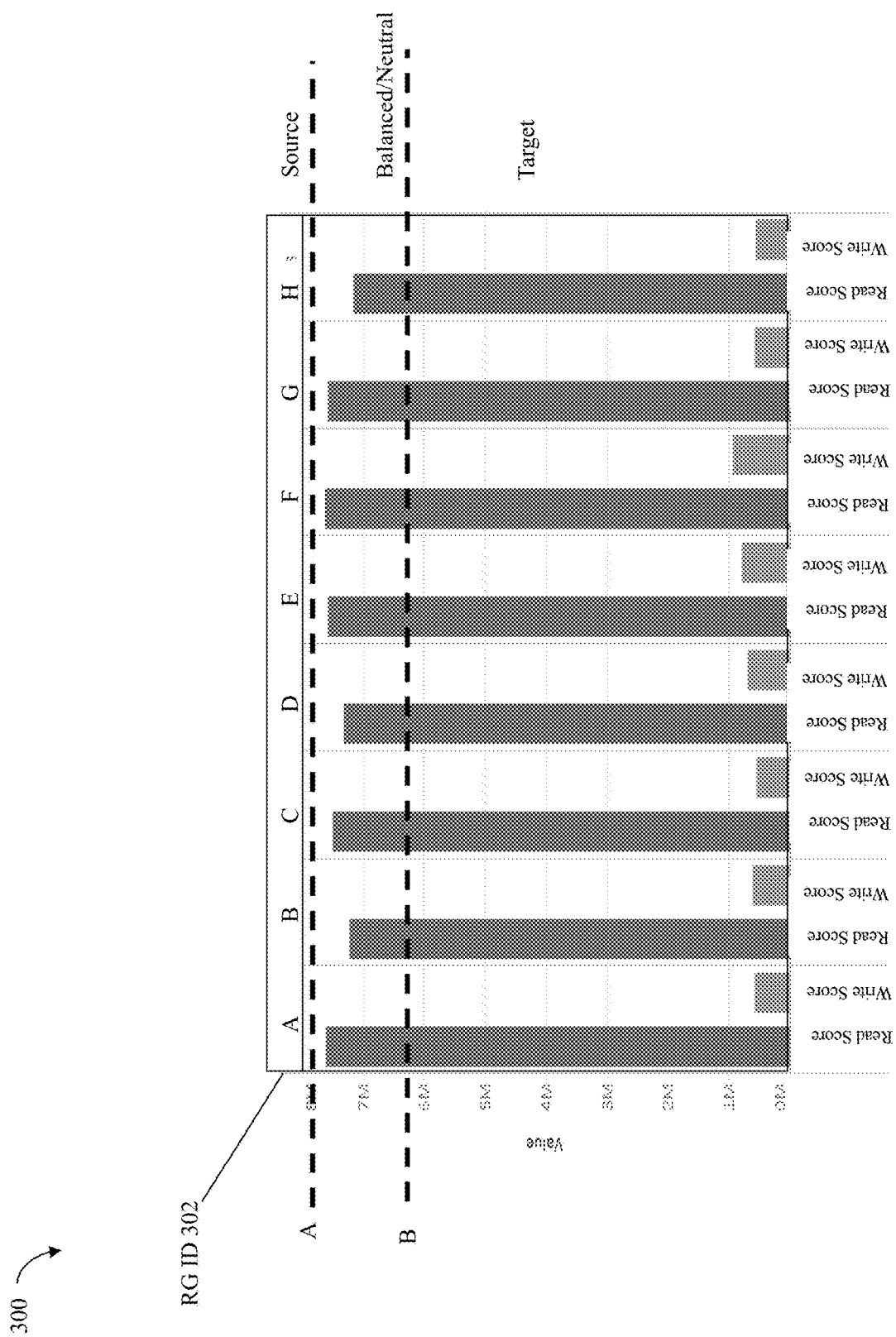
FIGS. 6, 7, 8 and 9 are graphical illustrations of scores, associated tolerances or thresholds, and classifications that may be used in an embodiment in accordance with the techniques herein.

Referring to FIG. 6, shown is a graphical illustration of read and write scores for the RAID groups of a storage tier in an embodiment in accordance with the techniques herein. In the example 300 at a first point in time, there may be 8 RGs in a single storage tier. For reference purposes, the 8 RGs may be denoted by the RG identifiers (IDs) RG A-H as denoted by 302. The example 300 illustrates the read and write scores for each of the 8 RGs in the form of a bar graph or chart with the height of each bar denoting the value of each score.

In this example of FIG. 6, assume that the PDs of the various RGs A-H have the same storage capacities. For example, assume that all PDs of the RGs A-H are each 2 TB in size.

After forecasting or predicting the read score and the write score for each RG, processing may be performed to identify any of the RGs that are outliers not within specified tolerance limits. For example, an embodiment may determine read scores with respect to all the RGs and define a tolerance whereby all read scores of the RGs should be within a specified number of standard deviations or amount from the mean or average read score. For example, an embodiment may specify that all the RG read scores should be within +/−3 standard deviations of the mean or average RG read score. As another example, an embodiment may specify that all the RG read scores should be within a window that is +/−10% of the average RG read score.

An embodiment may classify a RG as having a read score that is balanced or neutral if the read score is within the specified tolerance or limits. Otherwise, the RG's read score may be unbalanced. If the RG's read score is unbalanced, the RG may be further classified as having a read score that is a source or a target. The RG may be a source with respect to its read score if the RG's read score exceeds the specified tolerance window thereby indicating that the RG's read workload needs to be decreased. The RG may be a target with respect to its read score if the RG's read score is less the specified tolerance window thereby indicating that the RG's read workload needs to be increased. Thus, each RG's read score may be classified as one of source, neutral or target. As described in more detail below, a RG having a read score classified as a source may serve as a source or donor of candidate data portions that may be further evaluated for movement out of the RG. A RG having a read score classified as a target may serve as a candidate target or receiving RG that may be further evaluated to accept or receive data portions from another RG within the tier. A RG of neutral may be further evaluated as either a candidate receiving RG that receives a data portion or a candidate donor RG that donates a data portion, while also maintaining its neutral or balanced classification. A goal may be to select one or more data movements that alleviate or remove an unbalanced classification of source or target with respect to a read score of an RG.

A first RG classified as a source may have one or more data portions moved from the first RG to another receiving RG in the same tier in order to reduce the read workload of the first RG and to work toward having the read workload of the first RG be within the neutral or balanced limits. The receiving RG may be selected from other RGs of the same tier that are classified as a target or neutral with respect to its read score. Any candidate data movement of a data portion from the first RG (source) into the receiving RG may be modeled by shifting the data portion's total I/O workload (both read and write I/O workloads) to the receiving RG. In at least one embodiment, the candidate data movement may be implemented or performed if the modeling of the data movement indicates the data movement does not result in the receiving RG transitioning from a balanced classification to an unbalanced classification with respect to any of its scores including its read score, write score and idle capacity score discussed in more detail elsewhere herein; and also does not result in the first RG (source) transitioning from a balanced classification to an unbalanced classification with respect to any of its scores including the read score, the write score and the idle capacity score discussed in more detail elsewhere herein.

A second RG classified as a target may have one or more data portions moved into the second RG from another donor RG in the same tier in order to increase the read workload of the second RG and have the read workload of the second RG within the neutral or balanced limits. In at least one embodiment, any data movements of data portions into or out of an RG classified as neutral may be performed so long as the RG maintains its neutral classification with respect to its scores including its read score, write score and idle capacity score. Any candidate data movement of a data portion into the target second RG may be modeled by shifting the data portion's total I/O workload (both read and write I/O workloads) from the donor RG to the receiving or target second RG. In at least one embodiment, the candidate data movement may be implemented or performed if the modeling of the data movement indicates the data movement does not result in the receiving RG transitioning from a balanced classification to an unbalanced classification with respect to any of its scores including its read score, write score and idle capacity score discussed in more detail elsewhere herein; and also does not result in the donor RG transitioning from a balanced classification to an unbalanced classification with respect to any of its scores including the read score, write score and idle capacity score discussed in more detail elsewhere herein.

In at least one embodiment, if there is any RG that has an unbalanced read score, a normalization process may be triggered that will attempt data placement or data movement to alleviate the unbalanced read classification of the particular RG. In such case, the processing may be performed to transition the unbalanced read score of the RG to a balanced read score classification.

With reference to FIG. 6, the lines A and B may be used to denote the boundaries or tolerance limits used for read score classification. The line A may denote a first boundary or threshold where all read scores above the line A are classified as unbalanced and further classified as a source. The line B may denote a second boundary or threshold where all read scores below the line B are classified as unbalanced and further classified as a target. Assuming A denotes the read score of the line A, and B denotes the read score of the line B, all other read scores, R, that meet the following condition, where A≤R≤B, are classified as neutral or balanced.

With reference to FIG. 6, the example 300 illustrates that all 8 read scores of the 8 RGs A-H are neutral or balanced. In this case, no data placement or movement may be performed since all the RGs have balanced or neutral read scores.

Figure 7:
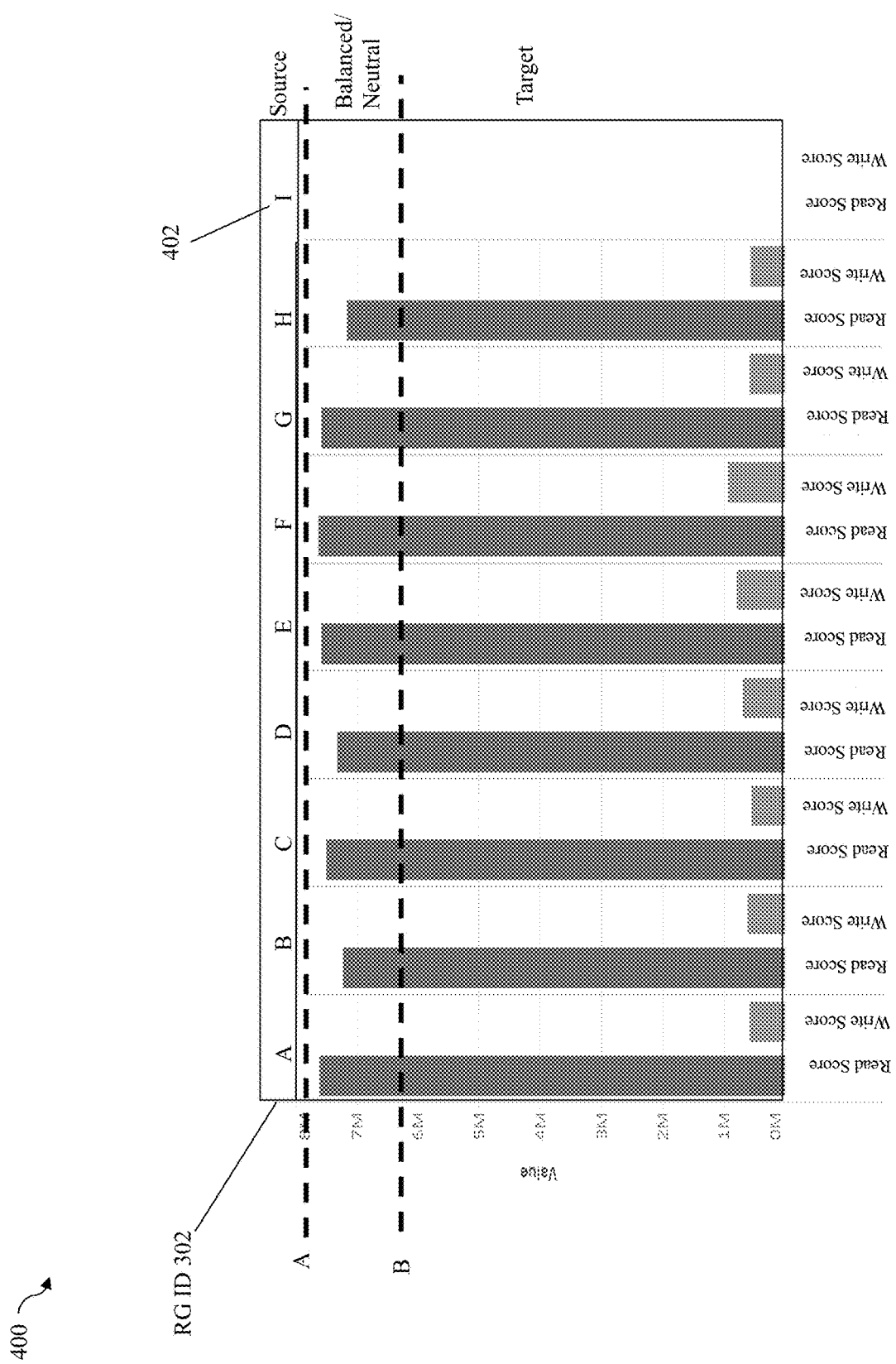

Now, consider a second point in time where an additional new RG I is added to the storage tier thereby making a total of 9 RGs in the storage tier. Reference is made to FIG. 7 illustrating the read and write scores of the 9 RGs at the second point in time immediately upon adding the new RG I. At this second point in time, the RG I 402 may have no data portions stored therein and thus have zero values for its read score and its write score. The new RG I 402 may be classified with respect to its read score whereby the RG I has a read score classification of unbalanced, and in particular a target classification.

In this example of FIG. 7, assume that the PDs of the various RGs A-H have the same storage capacities. For example, assume that all PDs of the RGs A-H are each 2 TB in size as noted above. Assume further that the newly added RG I has PDs that are each 8 TB in size. Note that the read score thresholds A and B used to classify a RG with respect to its read score do not vary with, or are independent of, the PD member capacity of the RGs. For example, the RGs A-H may be configured from the member PDs that are each 2 TB in size, and the RG I may be configured from the member PDs that are each 8 TB in size. However, in an embodiment in accordance with the techniques herein, the target or goal read workload range, as denoted by the neutral or balanced classification bounded by read score associated with the lines A and B, is the same for all the 9 RGs independent of the storage capacity of the PDs in the 9 RGs. Put another way, the tolerances, boundaries or limits are used to define the target read I/O workload that is associated with the neutral or balanced classification, where the same target read I/O workload is used for all the RGs and does not vary with the storage capacity of the PDs in the 9 RGs.

Consistent with other discussion herein, any RG that has an unbalanced read score may trigger normalization processing that attempts to alleviate or transition the RG from having an unbalanced read score classification to a balanced or neutral classification. Note that the read score thresholds A and B used to classify a RG with respect to its read score do not vary with, or are independent of, the PD member capacity of the RGs. Thus the same tolerances or thresholds denoted by the lines A and B are also used in connection with classification of the read score of the newly added RG I.

Based on the read score classifications illustrated in FIG. 7, the RGs A-H are classified as neutral, and the RG I 402 is classified as unbalanced and further classified as a target. In this case since not all the RGs have a read score classification of neutral or balanced, normalization processing is triggered that will attempt to perform one or more data movements to alleviate or remove the unbalanced read score of the RG I. Such normalization processing attempts to transition the read score classification of the RG I from the unbalanced target classification to the balanced classification. Generally, normalization processing may identify data movement candidates that may move a data portion from a donor RG, that is one of the RGs A-H, to the receiving RG, that is the RG I having the target read score classification. Consistent with other discussion herein, such processing may include identifying the one or more data movements candidates from one or more of the donor RGs A-H where modeling such data movements does not result in the either the donor RGs or the receiving RG becoming unbalanced with respect to the read scores, the write scores and the idle capacity scores of such RGs as discussed in more detail elsewhere herein.

What will now be described is use of the write scores and associated tolerances or thresholds in connection with the techniques herein. Consistent with discussion above, a first set of 8 RGs A-H are configured from the member PDs that are each 2 TB in size, and that the remaining RG I is configured from the member PDs that are each 8 TB in size. In an embodiment in accordance with the techniques herein, the write score thresholds and tolerances used in connection with classifying the write scores of the RGs may vary with the relative capacity of the PDs of the RGs. In other words, different write score thresholds or tolerances are used in connection with classifying the first set of RGs and the RG I. First write score thresholds or tolerances may be used in connection with classifying the write scores of the first set of RGs, and second write score thresholds or tolerances may be used in connection with classifying the write score of the newly added RG I, where the first write score thresholds or tolerances are different than the second write score thresholds or tolerances.

Figure 8:
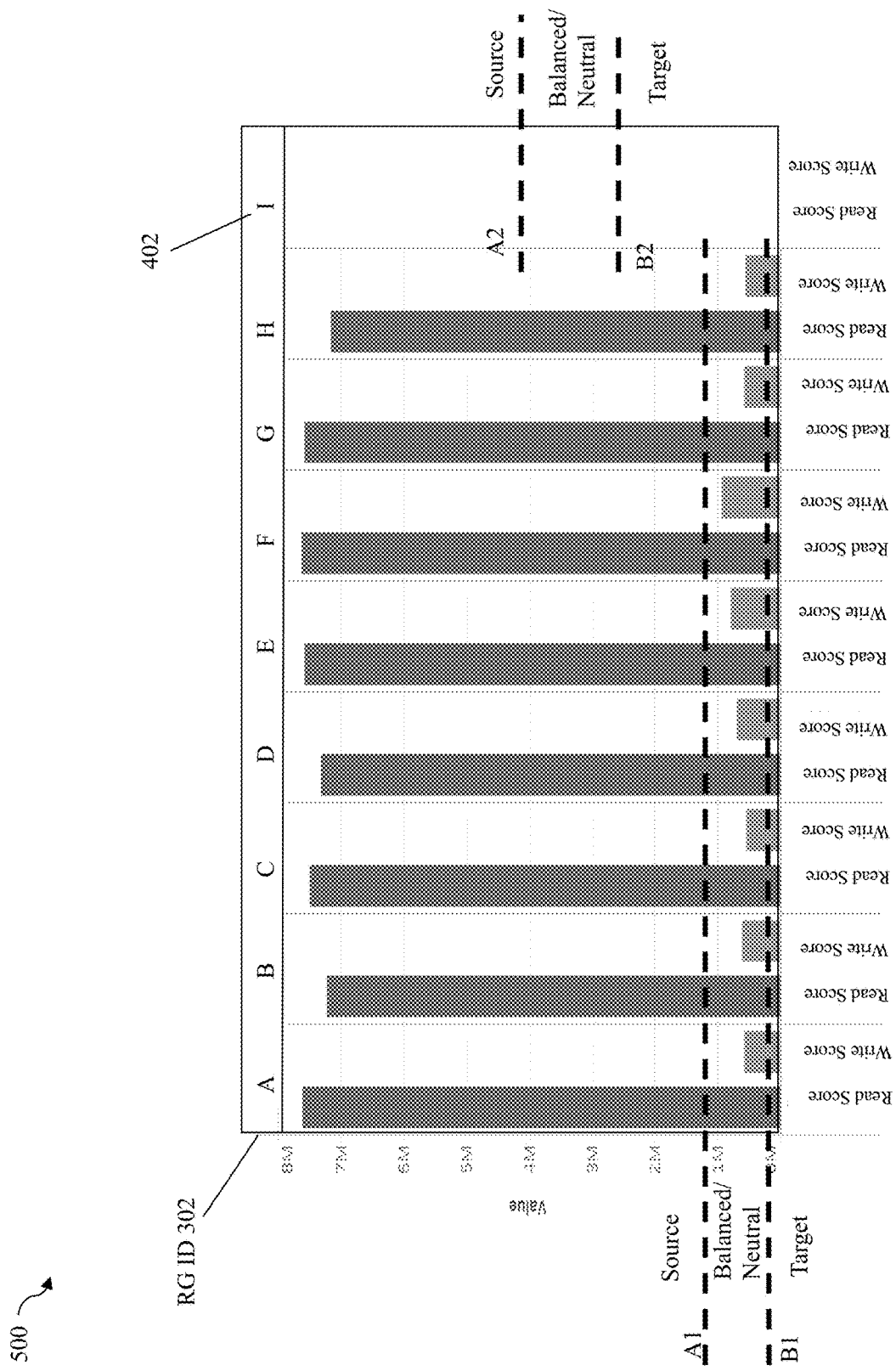

Referring to FIG. 8, shown is an example illustrating the different write thresholds and tolerances used in an embodiment in accordance with the techniques herein. The example 500 includes the read and write scores of the 9 RGs as illustrated in FIG. 7. Additionally, FIG. 8 further includes the lines A1, B1, A2 and B2, where the lines A1 and B1 denote the boundaries or tolerance limits used for write score classification used with the RGs A-H having 2 TB PDs; and the lines A2 and B2 denote the boundaries or tolerance limits used for write score classification used with the RG I having 8 TB PDs.

The line A1 may denote a first boundary or threshold where all write scores of RGs A-H above the line A1 are classified as unbalanced and further classified as a source. The line B1 may denote a second boundary or threshold where all write scores below the line B1 are classified as unbalanced and further classified as a target. Assuming A1 denotes the write score of line A1 and B1 denotes the write score of line B1, all the write scores, W, that meet the following condition, where A1≤W≤B1, are classified as neutral or balanced. In this example 500, all the RGs A-H have write scores that are classified as neutral or balanced since all such write scores of these RGs fall in between the lines A1 and B1. In the example 500, all the RGs A-H meet the specified target or goal write I/O workload range denoted by the lines A1 and B1.

The line A2 may denote a first boundary or threshold where if the write score of the RG I is above the line A2, the write score is classified as unbalanced and further classified as a source. The line B2 may denote a second boundary or threshold where if the write score for the RG I is below the line B2, the write score is classified as unbalanced and further classified as a target. Assuming A2 denotes the write score of the line A2 and B2 denotes the write score of the line B2, a write score, W, that meets the following condition, where A2≤W≤B2, is classified as neutral or balanced. In this example 500, the RG I has write score that is classified as unbalanced, and further classified as a target since the write score of the RG I is 0 and falls below the line B2. In the example 500, the lines A2 and B2 may denote the specified target or goal write I/O workload range for RG I, whereby for the RG 1 to meet its target write I/O workload range, its write score would need to be classified as neutral or balanced. However, in this example 500, the RG I does not meet its specified target or goal write I/O workload range denoted by the lines A2 and B2.

Consistent with discussion herein, an embodiment may determine a write score for each RG, may determine tolerances or thresholds for each RG based on the the per PD capacity of the RG, and may then classify each RG's write score based on such tolerances or thresholds. Each such write score may be classified as neutral or balanced if the write score is within the specified tolerances or threshold. Otherwise, if the RG's write score is not neutral or balanced, the RG's write score is unbalanced. If the RG's write score is unbalanced, the RG's write score may be further classified as a source or a target. The RG may be a source with respect to its write score if the RG's write score exceeds the specified tolerance window thereby indicating that the RG's write workload needs to be decreased. The RG may be a target with respect to its write score if the RG's write score is less the specified tolerance window thereby indicating that the RG's write workload needs to be increased. Thus, each RG's write score may be classified as one of source, neutral or target.

If there is any RG that has an unbalanced write score, a normalization process may be triggered that will attempt data movements or placements to alleviate the unbalanced write classification of the particular RG. In such case, the processing may be performed to transition the unbalanced write score of the RG to a balanced write score classification.

As noted above, the write score thresholds and tolerances may scale with the relative capacity of each PD of the RG. In particular, as the PD capacity increases, so does the write score thresholds or tolerances. In at least one embodiment, the write score thresholds may scale linearly with the relative PD capacity differences among the different RGs. For example, if a first RG has a per PD capacity of 2 TB and a second RG has a per PD capacity of 8 TB, then the second RG thresholds or tolerances may be 4 times that of the first RG. To further illustrate, assume the first RG has a write score threshold or tolerance of N write IOPS+/−M write IOPs. In this case, the second RG has a write threshold or tolerance of 4N write IOPS+/−M write IOPs. In at least one embodiment, "N TOPS" may denote the average write score of all the RGs; and M may denote a positive integer. If desired, an embodiment may also further scale the "M" in a linear manner so that the second RG has a write threshold or tolerance of 4N write IOPS+/−4M write IOPs.

As another example, assume the first RG, where each PD of the RG has a 2 TB capacity PD, has a balanced or neutral classification with an associated write score range of 200-400 write IOPs. In this case, the second RG, where each PD of the second RG has a 8 TB capacity, has a balanced or neutral classification with an associated write score range of 800-1600 write IOPs where the starting and ending amounts of the range are each 4 times that of the first RG.

With reference again to FIG. 8, the write score thresholds or tolerances may vary with the capacity of each PD of the RG. For example, the RGs A-H may have the same per PD member capacity of 2 TB. The newly added RG I may have a per PD member capacity of 8 TB so that its write thresholds denoted by the lines A2 and B2 may be scaled up linearly with respect to those write thresholds denoted by the lines A1 and B1 used in connection with the other original 8 RGs A-H.

Consistent with other discussion herein, any RG that has an unbalanced write score may trigger a normalization process that attempts to alleviate or transition the RG from having an unbalanced write score classification to a balanced or neutral classification.

Based on the write score classifications illustrated in FIG. 8, the RGs A-H are classified as neutral, and the RG I 402 is classified as unbalanced and further classified as a target. In this case since not all the RGs have a write score classification of neutral or balanced, normalization processing is triggered that will attempt to perform one or more data movements to alleviate or remove the unbalanced write score of the RG I. Such normalization processing attempts to transition the write score classification of the RG I from the unbalanced target classification to the balanced classification. Generally, normalization processing may identify data movement candidates that may move a data portion from a donor RG, that is one of the RGs A-H, to the receiving RG, that is the RG I having the target write score classification. Consistent with other discussion herein, such processing may include identifying the one or more data movements candidates from one or more of the donor RGs A-H where modeling such data movements does not result in the either the donor RGs or the receiving RG transitioning from a balanced to an unbalanced classification with respect to read scores, write scores and idle capacity scores of such RGs as discussed in more detail elsewhere herein.

What will now be described is use of the idle capacity scores and associated tolerances or thresholds in connection with the techniques herein. Consistent with discussion above, a first set of the 8 RGs A-H are configured from the member PDs that are each 2 TB in size, and that the remaining RG I is configured from the member PDs that are each 8 TB in size. In an embodiment in accordance with the techniques herein, the idle capacity score thresholds and tolerances used in connection with classifying the idle capacity scores of the RGs may vary with the relative capacity of the PDs of the RGs. In other words, different idle capacity score thresholds or tolerances are used in connection with classifying the first set of RGs and the RG I. First idle capacity score thresholds or tolerances may be used in connection with classifying the idle capacity scores of the first set of RGs, and second idle capacity score thresholds or tolerances may be used in connection with classifying the idle capacity score of the newly added RG I, where the first idle capacity score thresholds or tolerances are different than the second idle capacity score thresholds or tolerances. In at least one embodiment, the idle capacity score may be based on an idle capacity statistic denoting the amount of idle data stored in the RG. The amount or the storage capacity of the idle data may be determined, for example, by determining the total size of all extents classified as idle based on tracked I/O workload statistics with respect to I/Os directed to the extents.

Figure 9:
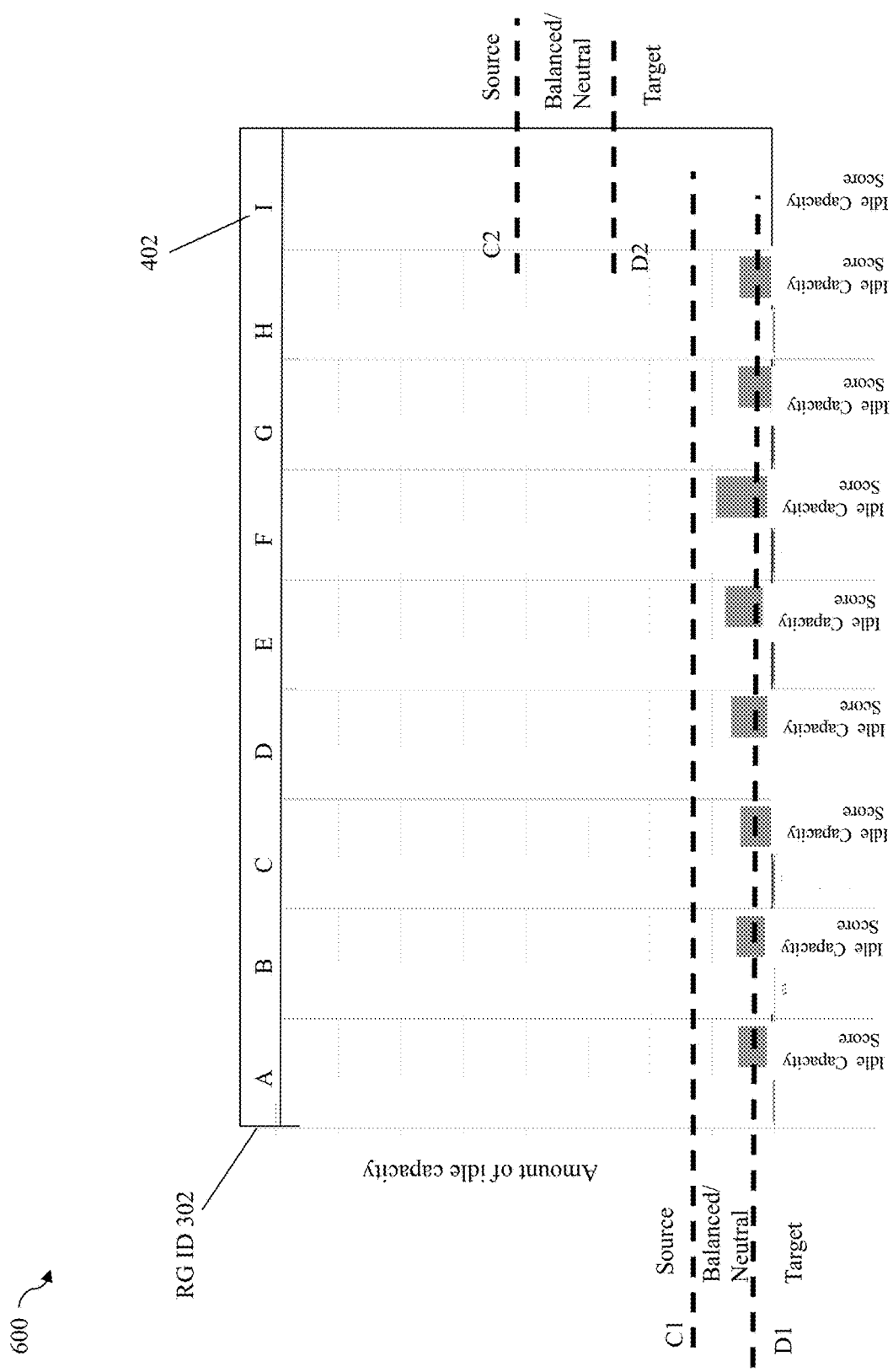

Referring to FIG. 9, shown is an example illustrating the different idle capacity thresholds and tolerances used in an embodiment in accordance with the techniques herein. The example 600 includes the idle capacity scores of the 9 RGs A-I. Additionally, FIG. 9 further includes the lines C1, D1, C2 and D2, where the lines C1 and D1 denote the boundaries or tolerance limits used for idle capacity score classification used with the RGs A-H having 2 TB PDs; and the lines C2 and D2 denote the boundaries or tolerance limits used for idle capacity score classification used with the RG I having 8 TB PDs.

The line C1 may denote a first boundary or threshold where all idle capacity scores of RGs A-H above line C1 are classified as unbalanced and further classified as a source. The line D1 may denote a second boundary or threshold where all idle capacity scores below the line D1 are classified as unbalanced and further classified as a target. Assuming C1 denotes the idle capacity score of the line C1, and D1 denotes the idle capacity score of the line D1, all idle capacity scores, V, that meet the following condition, where C1≤V≤D1, are classified as neutral or balanced. In this example 600, all the RGs A-H have idle capacity scores that are classified as neutral or balanced since all such idle capacity scores of these RGs fall in between the lines C1 and D1. In the example 600, all the RGs A-H meet the specified target or goal idle capacity range denoted by the lines C1 and D1.

The line C2 may denote a first boundary or threshold where if the idle capacity score of the RG I is above the line C2, the idle capacity score classified as unbalanced and further classified as a source. The line D2 may denote a second boundary or threshold where if the idle capacity score for the RG I is below the line B2, the idle capacity score is classified as unbalanced and further classified as a target. Assuming C2 denotes the idle capacity score of the line C2, and D2 denotes the idle capacity score of the line D2, an idle capacity score, V, that meets the following condition, where C2≤W≤D2, is classified as neutral or balanced. In this example 600, the RG I has an idle capacity score that is classified as unbalanced, and further classified as a target since the idle capacity score of the RG I is 0 and falls below the line D2. In the example 600, the lines C2 and D2 may denote the specified target or goal idle capacity range for RG I, whereby for the RG 1 to meet its target or goal idle capacity range, its idle capacity score would need to be classified as neutral or balanced. However, in this example 600, the RG I does not meet its specified target or goal idle capacity range denoted by the lines C2 and D2.

Consistent with discussion herein, an embodiment may determine an idle capacity score for each RG, may determine tolerances or thresholds for each RG based on the per PD capacity of the RG, and may then classify each RG's idle capacity score based on such tolerances or thresholds. Each such idle capacity score may be classified as neutral or balanced if the idle capacity score is within the specified tolerances or threshold. Otherwise, if the RG's idle capacity score is not neutral or balanced, the RG's idle capacity score is unbalanced. If the RG's idle capacity score is unbalanced, the RG's idle capacity score may be further classified as a source or a target. The RG may be a source with respect to its idle capacity score if the RG's idle capacity score exceeds the specified tolerance window thereby indicating that the amount of the RG's capacity consumed for storing idle data portions needs to be decreased. The RG may be a target with respect to its idle capacity score if the RG's idle capacity score is less the specified tolerance window thereby indicating that the amount of the RG's capacity consumed for storing idle data portions needs to be increased. Thus, each RG's idle capacity score may be classified as one of source, neutral or target.

If there is any RG that has an unbalanced idle capacity score, a normalization process may be triggered that will attempt data placement to alleviate the unbalanced idle capacity classification of the particular RG. In such case, the processing may be performed to transition the unbalanced idle capacity score of the RG to a balanced idle capacity score classification.

As noted above, the idle capacity score thresholds and tolerances scale with the relative capacity of each PD of the RGs. In particular, as the PD capacity increases, so does the idle capacity score thresholds or tolerances. In at least one embodiment, the idle capacity score thresholds may scale linearly with the relative PD capacity differences among the different RGs. For example, assume a first RG has a per PD capacity of 2 TB and a second RG has a per PD capacity of 8 TB as noted above. Also assume each RG has an idle capacity score threshold or tolerance denoting the amount (in GBs, MBs or some storage size unit) of the per PD capacity of a RG that is idle. To further illustrate, assume the first RG has an idle capacity score threshold or tolerance of N GBs+/−M GBs. In this case, the second RG has an idle capacity threshold or tolerance of 4N GBs+/−M GBs. In at least one embodiment, "N GBs" may denote the average idle capacity score of all the RGs; and M may denote a positive integer. If desired, an embodiment may also further scale the "M" in a linear manner so that the second RG has an idle capacity threshold or tolerance of 4N GBs+/−4M GBs.

As another example, assume the first RG, where each PD of the RG has a 2 TB capacity PD, has a balanced or neutral classification with an associated idle capacity score range of 200-400 GBs. In this case, the second RG, where each PD of the second RG has an 8 TB capacity, has a balanced or neutral classification with an associated idle capacity score range of 800-1600 GBs where the starting and ending amounts of the range are each 4 times that of the first RG.

The idle capacity score thresholds or tolerances may vary with the per PD capacity of each PD of the RGs. For example, with reference to FIG. 9, all 8 RGs A-H may have the same per PD member capacity such as 2 TB. The newly added RG I may have a per PD member capacity of 8 TB so that its idle capacity score thresholds are scaled up linearly with respect to those idle capacity score thresholds used in connection with the other original 8 RGs A-H.

Consistent with other discussion herein, any RG that has an unbalanced idle capacity score may trigger a normalization process that attempts to alleviate or transition the RG from having an unbalanced idle capacity score classification to a balanced or neutral classification.

Based on the idle capacity score classifications illustrated in FIG. 9, RGs A-H are classified as neutral, and RG I 402 is classified as unbalanced and further classified as a target. In this case since not all the RGs have an idle capacity score classification of neutral or balanced, normalization processing is triggered that will attempt to perform one or more data movements to alleviate or remove the unbalanced idle capacity score of RG I. Such normalization processing attempts to transition the idle capacity score classification of the RG I from the unbalanced target classification to the balanced classification. Generally, normalization processing may identify data movement candidates that may move a data portion from a donor RG, that is one of the RGs A-H, to the receiving RG, that is the RG I, having the target idle capacity score classification. Consistent with other discussion herein, such processing may include identifying the one or more data movements candidates from one or more of the donor RGs A-H where modeling such data movements does not result in the either the donor RGs or the receiving RG transitioning from a balanced to an unbalanced classification with respect to the read scores, the write scores and the idle capacity scores of such RGs as discussed in more detail elsewhere herein.

What will now be described in more detail is how an embodiment may determine and evaluate data movement candidates as part of the normalization process triggered for use with the techniques herein. Each such data movement candidate may be a proposed movement of data portion or extent from a donor RG to a receiving RG in an attempt to correct an unbalanced workload of the donor RG and/or the receiving RG. Consistent with discussion herein, the receiving RG may be a RG that is classified as a target or neutral based on one or more of the read score, write score and idle capacity score for the RG. Generally, a donor RG may be an RG that is classified as a source or neutral based on one or more of the read score, write score and idle capacity score for the RG. In at least one embodiment, priority may be given to using a "source" RG as a donor RG prior to considering use of a "neutral" or "balanced" RG as a donor RG. In at least one embodiment, priority may be given to using a "target RG" as a receiving RG prior to considering use of a "neutral" or "balanced" RG as a receiving RG.

Figure 10:
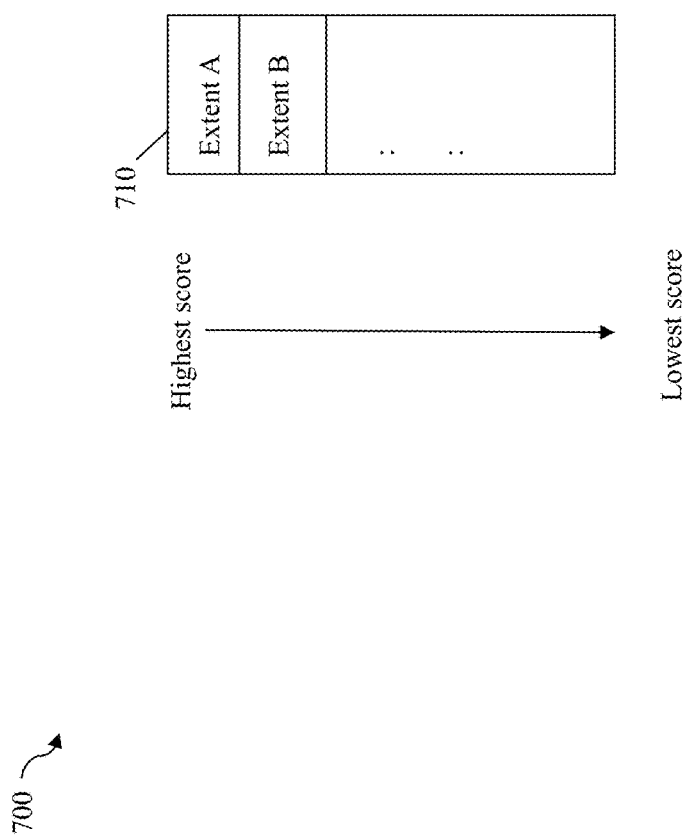
FIG. 10 is an example illustrating a sorted list of scores that may be used in an embodiment in accordance with the techniques herein.

With reference back to FIG. 7, normalization processing may be performed to determine and evaluate data movement candidates that attempt to correct the unbalanced target classification of the newly added RG I based on RG I's read score. In at least one embodiment, processing may including ranking or sorting the extents of the remaining RGs A-H based on decreasing read scores of the extents. As illustrated in FIG. 10, the ranking may result in a list 710 of extents. The extents or data portions may be further evaluated based on decreasing extent read score. A first extent, that has a higher read score than a second extent, may be considered as a data movement candidate prior to considering the second extent as a data movement candidate. For example, the extent A may be have a higher read score than the extent B, whereby the extent A may be considered as a candidate for data movement prior to extent B.

With reference back to FIG. 7, the receiving RG may be the target RG I, and processing may be performed to determine extents of the remaining RGs A-H that may be moved to the receiving RG I.

In at least one embodiment in connection with selecting extents to be moved to the receiving RG I, a first traversal of the list may be made to consider those extents that are included in an RG classified as a source based on the RG's read score. Subsequently, as may be needed, a second traversal of the list may be made to consider those extents that are included in an RG classified as neutral based on the RG's read score. When evaluating an extent on the list for movement to the target RG, processing may include modeling movement of the extent from the donor RG to the receiving RG. Such modeling may include modeling movement of the extent's I/O workload from the donor RG to the receiving RG.

In at least one embodiment, the extent may be moved from the donor RG to the receiving RG only if the modeling indicates that the data movement will not cause the donor RG or the receiving RG to transition from a balanced to an unbalanced classification as related to any of their respective read scores, write scores or idle capacity scores. For example, a first candidate extent of a donor RG may have a high write workload as well as a high read workload. Modeling may indicate that movement of the first extent to the receiving RG may cause the receiving RG to transition from the target classification to the balanced or neutral classification with respect to its read score. However, the modeling may also indicate that movement of the first extent to the receiving RG may cause the receiving RG's write score to exceed the goal or target write score range, where the modeling thus indicates that the data movement of the first extent would cause the receiving RG to transition from a balanced to an unbalanced source with respect to its read score. As a result, the first extent may not be moved.

As another example, consider a second extent of the donor RG. Modeling may indicate that movement of the second extent from the donor RG to the receiving RG may cause the receiving RG to transition from the target classification to the balanced or neutral classification with respect to its read score. However, the modeling may also indicate that movement of the second extent to the receiving RG may cause the donor RG to transition from a balanced to an unbalanced source with respect to one or more of its read score, write score and idle capacity score, where the modeling thus indicates that the data movement of the second extent would cause the source RG to transition from balanced to an unbalanced source. As a result, the second extent may not be moved.

As another example, consider a third extent of the donor RG. Modeling may indicate that movement of the third extent from the donor RG to the receiving RG may cause the receiving RG to transition from the target classification to the balanced or neutral classification with respect to its read score. The receiving RG may currently have a write score denoting a very high workload, where the write score of the receiving RG is classified as a target and therefore is unbalanced. Modeling may indicate that movement of the third extent to the receiving RG may further adversely increase the write workload of the target RG so that the target RG's write workload further increases and becomes further unbalanced. As a result, the third extent may not be moved. Thus, although modeling may not indicate the donor RG or the receiving RG transitions from unbalanced to balanced (with respect to any of their scores), the modeling may indicate that a current unbalanced condition may be further worsened as a result of a proposed data movement. In this case, processing may determine not to perform the data movement.

As another example, consider a fourth extent of the donor RG. Modeling may indicate that movement of the fourth extent from the donor RG to the receiving RG may cause the receiving RG to transition from the target classification to the balanced or neutral classification with respect to its read score. Further, modeling may indicate that the data movement of the fourth extent would not cause either the donor RG or the receiving RG to transition from a balanced classification to an unbalanced classification (with respect to any of their respective scores). Yet further, modeling may indicate that the data movement of the fourth extent would not worsen an existing unbalanced condition of either the donor RG or the target RG. In this case, processing may determine to perform the data movement. For example, with reference to FIG. 7, the fourth extent may be an extent from the RG A that is moved from the RG A to the RG I. Such a data movement may result in a reduced read score of the RG A that is still within the balanced classification (e.g., in the range denoted by the lines A and B) while also increasing the read score of the RG I. Additionally, prior to the movement of the fourth extent, the write score and idle capacity score of the RG A are balanced and the write score and idle capacity score of the RG I are both unbalanced (e.g., both targets). After movement of the fourth extent, modeling may indicate that the write score and idle capacity score of the RG A remain balanced and that the unbalanced condition or classification with respect to the scores of the RG I is not worsened.

In at least one embodiment, processing the sorted list of ranked extents may also skip a number of extents in the list. For example, in at least one embodiment, each extent from the list considered as a candidate for data movement may be every $NN^{th}$ extent from the list, where NN may be any suitable integer greater than 1. In at least one embodiment, NN may be selected based on the number of RGs. For example, with reference to FIG. 7, there are 9 RGs so when selecting extents from the list 710 in order of decreasing read score for further evaluation as a data movement candidate, every $9^{th}$ extent on the list may be selected (e.g., extent ranked at position 1, extent ranked at position 10, extent ranked at position 19, and so on).

Although not illustrated in the particular example of FIG. 7, normalization processing may be triggered when the read score of an RG is classified as a source. In this case, the RG having the source classification is the donor RG, where data movements are determined to move extents out of the donor RG to a receiving RG. The receiving RG may be an RG having a read score that is classified as a target or balanced. When considering different RGs as a receiving RG, preference may be given to RGs having a read score classified as target over other RGs having a read score classified as balanced or neutral. In a manner as described in connection with FIG. 10, the extents of potential receiving RGs may be ranked based on read scores, where the ranking may be from the highest extent read score to the lowest extent read score. The ranked extents may be considered and evaluated as described above in order to determine one or more data movements performed that alleviate or remove the unbalanced read score of the donor RG classified as a source.

Consistent with discussion herein, normalization processing may be triggered by an unbalanced write score and an unbalanced idle capacity score. It is straight forward to generally implement the processing described above to determine data movements performed to alleviate or correct an unbalanced write score of an RG and an unbalanced idle capacity score of an RG. For example, a write score of an RG may be classified as a source where processing may be performed similar to that as described above in connection with a read score of an RG classified as a source; a write score of an RG may be classified as a target where processing may be performed similar to that as described above in connection with a read score of an RG classified as a target; an idle capacity score of an RG may be classified as a source where processing may be performed similar to that as described above in connection with a read score of an RG classified as a source; and an idle capacity score of an RG may be classified as a target where processing may be performed similar to that as described above in connection with a read score of an RG classified as a target.

Based on the discussion above, a candidate data movement of an extent from a donor RG to a receiving RG may be implemented or performed if the candidate data movement generally meets specified data movement criteria. Thus, the data movements of particular extents may be determined in accordance with the data movement criteria. The data movement criteria may specify that the data movement may be implemented if the modeled data movement does not cause a new imbalance. For example, a data movement may not be performed if modeling the data movement indicates that, as a result of the data movement, the donor RG or the receiving RG would transition from a balanced classification to an unbalanced classification with respect to any of their associated scores. The data movement criteria may specify that the data movement may be implemented if the modeled data movement does not further worsen an existing imbalance such as may be the case where the donor RG or the receiving RG has an unbalanced classification prior to the data movement and modeling indicates that performing the data movement would further worsen the existing imbalance. For example, an RG may currently be classified as a source with respect to a write score and a data movement may not be performed where modeling of the data movement indicates that the write workload and thus the predicted write score further increases as a result of the data movement. The data movement criteria may specify that preference is given to certain receiving RGs when a particular score of the donor RG is classified as a source. For example, when the read score of a donor RG is classified as a source, preference may be given to use a receiving RG having a read score classified as a target over another receiving RG having a read score classified as balanced. The data movement criteria may specify that preference is given to certain donor RGs when a particular score of the receiving RG is classified as a target. For example, when the read score of a receiving RG is classified as a target, preference may be given to use a donor RG having a read score classified as a source over another donor RG having a read score classified as balanced. The data movement criteria may specify that every $NN^{th}$ extent in the list of sorted extents is considered, where the list is sorted from highest to lowest based on one of the scores.

An embodiment in accordance with the techniques herein may allot or limit an amount of resources of the system for use in performing the data movements selected by normalization processing. For example, in at least one embodiment, a specified number of data movements may be implemented periodically. The data movements selected may vary with the detected imbalances that trigger normalization processing. For example, consider an embodiment that performs 20 data movements every 5 seconds. At a first point in time, there may be only an unbalanced read score whereby all write scores and all idle capacity scores of all the RGs are balanced. In this case at the first point in time, all 20 data movements may be data movements performed to alleviate or remove the unbalanced read score. At a subsequent second point time, there may be one unbalanced read score, one unbalanced write score, and one unbalanced idle capacity score. At this second point in time, the 20 data movements performed may be selected to alleviate or remove the unbalanced read score, the unbalanced write score and the unbalanced idle capacity score. The 20 allowable data movements may be partitioned among the 3 types of unbalanced scores (e.g., read, write and idle capacity) using any suitable manner. For example, in at least one embodiment, a first amount of data movements may be performed with the goal of addressing the read score imbalance, a second amount of data movements may be performed with the goal of addressing the write score imbalance, and a third amount of data movements may be performed with the goal of addressing the idle capacity score imbalance. In at least one embodiment, the first amount and the second amount may be selected based on a ratio of the average read score with respect to the average write score at a particular point in time at which the data movements are determined. For example, the average read score of all the RGs may be 10 times the average write score for all the RGs whereby the data movements performed to alleviate imbalances may include 10 data movements to alleviate read score imbalances for every 1 data movement to alleviate write score imbalances. Generally, in such an embodiment, the average of each of the different types of scores may be used in determining the proportion of the data movements performed to alleviate unbalances of the different types of scores.

Described above are use of the techniques herein with respect to a single storage tier with multiple RAID groups where the tier includes PDs of different storage capacities configured into the multiple RAID groups. Additionally, another embodiment in accordance with the techniques herein may not include any RAID group configurations. Rather than include RAID groups, the tier may be logical grouping of PDs where such PDs are not configured into RAID groups. In this latter embodiment, the PDs of the logical grouping may have different storage capacities. The techniques herein may be used in this latter embodiment by applying processing described herein per PD rather than per RAID group. For example, the various workload statistics, the various tolerances or thresholds to classify the various workload scores or statistics, determining data movements, and the like, may be determined applied at the per PD level of granularity rather than the per RG level of granularity. In this latter embodiment, for example, the PDs of various capacities may be included in a storage pool or logical grouping of the PDs.

Figure 11:
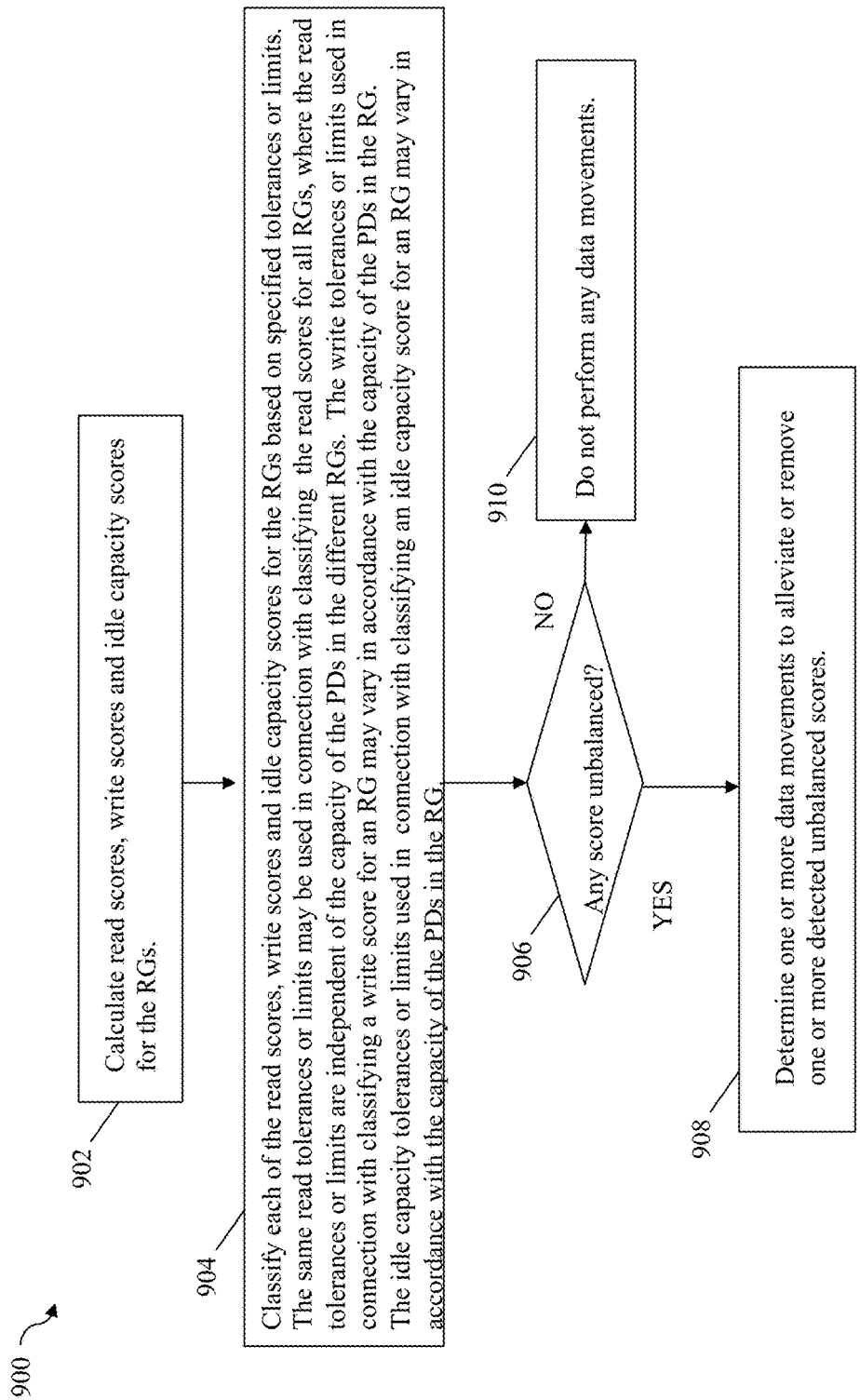
FIGS. 11 and 12 are flowcharts of processing steps that may be performed in an embodiment in accordance with the techniques herein.

Referring to FIG. 11, shown is a flowchart 900 of processing steps that may be performed in an embodiment in accordance with the techniques herein. The flowchart 900 summarizes processing described above.

At the step 902, processing may be performed to calculate read scores, write scores and idle capacity scores for the RGs. From the step 902, processing proceeds to the step 904. At the step 904, processing may be performed to classify the read scores, the write scores and the idle capacity scores for the RGs based on specified tolerances or limits. The same read tolerances or limits may be used in connection with classifying each the read scores for all the RGs, where the read tolerances or limits are independent of the capacity of the PDs in the different RGs. The write tolerances or limits used in connection with classifying a write score for an RG may vary in accordance with the capacity of the PDs in the RG. The idle capacity tolerances or limits used in connection with classifying an idle capacity score for an RG may vary in accordance with the capacity of the PDs in the RG. In at least one embodiment, the write tolerances or limits and the idle capacity tolerances or limits may scale linearly with the per PD capacity of the PDs included in each RG. From the step 904, control proceeds to the step 906.

At the step 906, a determination may be made as to whether any score classified in the step 904 is unbalanced. If the step 906 evaluates to yes, processing proceeds to the step 908. At the step 908, processing may be performed to determine one or more data movements to alleviate or remove one or more detected unbalanced scores. If the step 906 evaluates to no, processing proceeds to the step 910. At the step 910, no data movements are performed since the data movements are performed in accordance with the techniques herein to address detected workload imbalances reflected by unbalanced scores.

Figure 12:
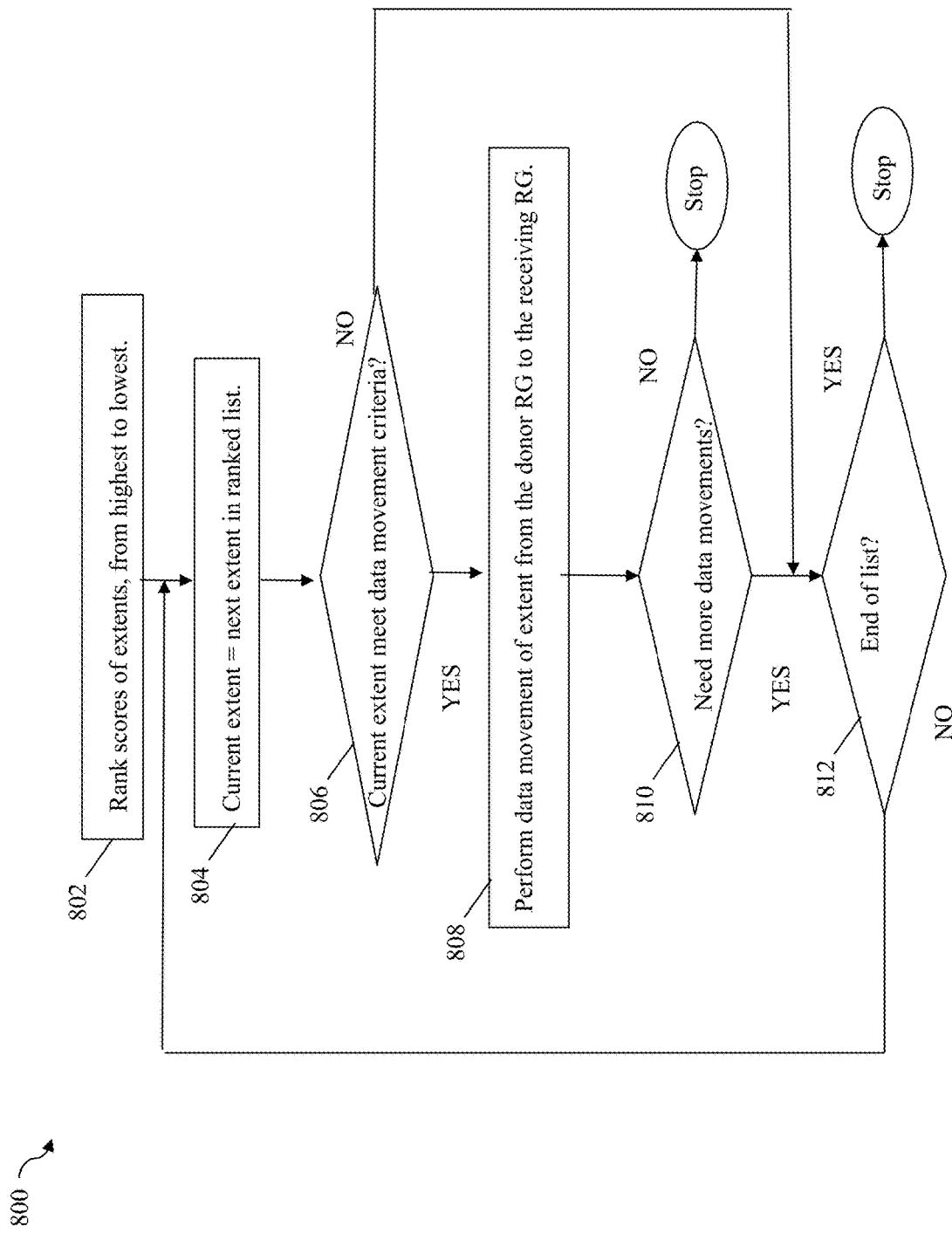

Referring to FIG. 12, shown is a flowchart 800 of processing steps that may be performed in an embodiment in accordance with the techniques herein. The flowchart 800 summarizes processing described above that may be performed as part of normalization processing to determine data movements to address an imbalance with respect to one of the types of scores, such as read, write or idle capacity.

At the step 802, the score of the extents in the candidate RGs may be ranked from highest to lowest. From the step 802, control proceeds to the step 804. At the step 804, the current extent is assigned the next extent in the ranked list, where the list is traversed based on ranking from highest score to lowest score. From the step 804, control proceeds to the step 806. At the step 806, a determination is made as to whether the current extent meets the data movement criteria. If the step 806 evaluates to no, control proceeds to the step 812. If the step 806 evaluates to yes, control proceeds to the step 808. At the step 808, the data movement of the current extent from the donor RG to a receiving RG is performed. The receiving RG may also be determined in accordance with the data movement criteria. From the step 808, control proceeds to the step 810. At the step 810, a determination is made as to whether additional data movements are needed with respect to the particular type of scores in the sorted list. If the step 810 evaluates to no, processing stops. If the step 810 evaluates to yes, control proceeds to the step 812. At the step 812 a determination is made as to whether the current extent is the last extent in the list. If the step 812 evaluates to yes, processing stops. If the step 812 evaluates to no, control proceeds to the step 804.

The techniques herein may be performed using any suitable hardware and/or software. For example, the techniques herein may be performed by executing code which is stored on any one or more different forms of computer-readable media. Computer-readable media may include different forms of volatile (e.g., RAM) and non-volatile (e.g., ROM, flash memory, magnetic or optical disks, or tape) storage which may be removable or non-removable.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method of performing data movements comprising:
configuring a plurality of RAID groups included in a same storage tier, wherein a first of the plurality of RAID groups includes a first plurality of physical storage devices each having a first storage capacity, and wherein a second of the plurality of RAID groups includes a second plurality of physical storage devices each having a second storage capacity, wherein the first storage capacity of each physical storage device of the first RAID group is greater than the second storage capacity of each physical storage device of the second RAID group;
selecting, in accordance with criteria, a first data portion from the first RAID group for data movement to the second RAID group, wherein the criteria include a read workload criterion that specifies a same target read I/O workload denoting a same read I/O workload goal for each of the plurality of RAID groups, wherein the criteria include a write workload criterion specifying a plurality of target write I/O workloads denoting write I/O workload goals for the plurality of RAID groups, wherein the plurality of target write I/O workloads scale linearly in accordance with a plurality of individual storage device capacities each denoting a storage capacity for each physical storage device of one of the plurality of RAID groups, and wherein the first RAID group has a first target write I/O workload of the plurality of target write I/O workloads that is higher than a second target write I/O workload of the plurality of target write I/O workloads of the second RAID group; and
responsive to said selecting the first data portion for data movement, performing the data movement of the first data portion from the first RAID group to the second RAID group.

2. The method of claim 1, wherein the same target read I/O workload is a same target read I/O workload range.

3. The method of claim 2, wherein the write workload criterion specifies one of the plurality of target write I/O workloads for each of the plurality of RAID groups.

4. The method of claim 3, wherein the plurality of target write I/O workloads is a plurality of target write I/O workload ranges.

5. The method of claim 4, further comprising:
predicting a plurality of write scores for the plurality of RAID groups, wherein each of the plurality of write scores denotes a write score for a different one of the plurality of RAID groups; and
classifying each of the plurality of write scores corresponding to one of the plurality of RAID groups as balanced or unbalanced, wherein said each write score is balanced if said each write score is within a particular one of the plurality of target write I/O workload ranges associated with said one RAID group, and wherein said each write score is otherwise unbalanced.

6. The method of claim 5, further comprising:
determining, in accordance with said classifying, that one of the first RAID group and the second RAID group has an unbalanced write score; and
responsive to determining that one of the first RAID group and the second RAID group has an unbalanced write score, performing first processing to alleviate or correct the unbalanced write score, wherein said first processing includes:
  selecting, in accordance with the criteria, a second data portion for data movement between the first RAID group and the second RAID group; and
  responsive to said selecting the second data portion, performing the data movement of the second data portion between the first RAID group and the second RAID group.

7. The method of claim 1, wherein the second storage capacity of each physical storage device of the second RAID group is N storage units, wherein the first storage capacity of each physical storage device of the first RAID group is an amount of storage equal to M*N storage units, wherein the first RAID group has the first target write I/O workload which is approximately M times the second target write I/O workload, within specified limits.

8. The method of claim 4, further comprising:
  modeling movement of the first data portion from the first RAID group to the second RAID group.

9. The method of claim 2, wherein the same read I/O workload range for each of the plurality of RAID groups indicates that each of the plurality of RAID groups should have approximately a same read I/O workload, within specified limits, independent of capacities of physical drives of the plurality of RAID groups.

10. The method of claim 2, further comprising:
  predicting a plurality of read scores for the plurality of RAID groups, wherein each of the plurality of read scores denotes a read score for a different one of the plurality of RAID groups;
  classifying each of the plurality of read scores corresponding to one of the plurality of RAID groups as balanced or unbalanced, wherein said each read score is balanced if said each read score is within the same target read I/O workload range and wherein said each read score is otherwise unbalanced;
  determining, in accordance with said classifying, that one of the first RAID group and the second RAID group has an unbalanced read score; and
  responsive to determining that one of the first RAID group and the second RAID group has an unbalanced read score, performing first processing to alleviate or correct the unbalanced read score, wherein said first processing includes said selecting the first data portion and said performing the data movement of the first data portion.

11. The method of claim 2, wherein the criteria include an idle capacity criterion specifying a plurality of target idle capacity amounts each denoting a target capacity of idle data for an associated one of the plurality of RAID groups, and wherein the plurality of target idle capacity amounts for the plurality of RAID groups vary in accordance with storage capacities of physical storage devices of the plurality of RAID groups.

12. The method of claim 11, wherein the plurality of target idle capacity amounts is a plurality of target idle capacity ranges, and wherein the method further comprises:
  predicting a plurality of idle capacity scores for the plurality of RAID groups, wherein each of the plurality of idle capacity scores denotes an idle capacity score for a different one of the plurality of RAID groups; and
  classifying each of the plurality of idle capacity scores corresponding to one of the plurality of RAID groups as balanced or unbalanced, wherein said each idle capacity score is balanced if said each idle capacity score is within a particular one of the plurality of target idle capacity ranges associated with said one RAID group, and wherein said each idle capacity score is otherwise unbalanced.

13. The method of claim 12, further comprising:
determining, in accordance with said classifying, that one of the first RAID group and the second RAID group has an unbalanced idle capacity score; and
responsive to determining that one of the first RAID group and the second RAID group has an unbalanced idle capacity score, performing first processing to alleviate or correct the unbalanced idle capacity score, wherein said first processing includes:
  selecting, in accordance with the criteria, a second data portion for data movement between the first RAID group and the second RAID group; and
  responsive to said selecting the second data portion, performing the data movement of the second data portion between the first RAID group and the second RAID group.

14. The method of claim 8, further comprising:
determining whether said modeling indicates that movement of the first data portion from the first RAID group to the second RAID group would cause any of the first RAID group and the second RAID group to transition from a balanced classification to an unbalanced classification with respect to one or more of the criteria, wherein the criteria include the read workload criterion, the write workload criterion, and an idle capacity criterion;
determining whether said modeling indicates that movement of the first data portion from the first RAID group to the second RAID group would further worsen an existing imbalance for a first of the criteria for any of the first RAID group and the second RAID group; and
responsive to determining that said modeling indicates that movement of the first data portion from the first RAID group to the second RAID group would not cause any of the first RAID group and the second RAID group to transition from a balanced classification to an unbalanced classification with respect one more of the criteria, and would not further worsen an existing imbalance for a first of the criteria for any of the first RAID group and the second RAID group, performing said selecting that selects the first data portion for the data movement from the first RAID group to the second RAID group.

15. A system comprising:
one or more processors; and
one or more memories comprising code stored thereon that, when executed performs a method of performing data movements comprising:
  configuring a plurality of RAID groups included in a same storage tier, wherein a first of the plurality of RAID groups includes a first plurality of physical storage devices each having a first storage capacity, and wherein a second of the plurality of RAID groups includes a second plurality of physical storage devices each having a second storage capacity, wherein the first storage capacity of each physical storage device of the first RAID group is greater than the second storage capacity of each physical storage device of the second RAID group;
  selecting, in accordance with criteria, a first data portion from the first RAID group for data movement to the second RAID group, wherein the criteria include a read workload criterion that specifies a same target read I/O workload denoting a same read I/O workload goal for each of the plurality of RAID groups, wherein the criteria include a write workload criterion specifying a plurality of target write I/O workloads denoting write I/O workload goals for the plurality of RAID groups, wherein the plurality of target write I/O workloads scale linearly in accordance with a plurality of individual storage device capacities each denoting a storage capacity for each physical storage device of one of the plurality of RAID groups, and wherein the first RAID group has a first target write I/O workload of the plurality of target write I/O workloads that is higher than a second target write I/O workload of the plurality of target write I/O workloads of the second RAID group; and responsive to said selecting the first data portion for data movement, performing the data movement of the first data portion from the first RAID group to the second RAID group.

16. A non-transitory computer readable medium comprising code stored thereon that, when executed, performs a method of performing data movements comprising:

configuring a plurality of RAID groups included in a same storage tier, wherein a first of the plurality of RAID groups includes a first plurality of physical storage devices each having a first storage capacity, and wherein a second of the plurality of RAID groups includes a second plurality of physical storage devices each having a second storage capacity, wherein the first storage capacity of each physical storage device of the first RAID group is greater than the second storage capacity of each physical storage device of the second RAID group;

selecting, in accordance with criteria, a first data portion from the first RAID group for data movement to the second RAID group, wherein the criteria include a read workload criterion that specifies a same target read I/O workload denoting a same read I/O workload goal for each of the plurality of RAID groups, wherein the criteria include a write workload criterion specifying a plurality of target write I/O workloads denoting write I/O workload goals for the plurality of RAID groups, wherein the plurality of target write I/O workloads scale linearly in accordance with a plurality of individual storage device capacities each denoting a storage capacity for each physical storage device of one of the plurality of RAID groups, and wherein the first RAID group has a first target write I/O workload of the plurality of target write I/O workloads that is higher than a second target write I/O workload of the plurality of target write I/O workloads of the second RAID group; and responsive to said selecting the first data portion for data movement, performing the data movement of the first data portion from the first RAID group to the second RAID group.

17. The non-transitory computer readable medium of claim 16, wherein the same target read I/O workload is a same target read I/O workload range.

18. The non-transitory computer readable medium of claim 17, wherein the write workload criterion specifies one of the plurality of target write I/O workloads for each of the plurality of RAID groups.

19. The non-transitory computer readable medium of claim 18, wherein the plurality of target write I/O workloads is a plurality of target write I/O workload ranges.

20. The non-transitory computer readable medium of claim 19, where the method further comprises:

predicting a plurality of write scores for the plurality of RAID groups, wherein each of the plurality of write scores denotes a write score for a different one of the plurality of RAID groups; and classifying each of the plurality of write scores corresponding to one of the plurality of RAID groups as balanced or unbalanced, wherein said each write score is balanced if said each write score is within a particular one of the plurality of target write I/O workload ranges associated with said one RAID group, and wherein said each write score is otherwise unbalanced.

* * * * *